US008555178B2

(12) United States Patent
Blair

(10) Patent No.: US 8,555,178 B2
(45) Date of Patent: Oct. 8, 2013

(54) ENHANCEMENTS TO UNIFIED COMMUNICATIONS AND MESSAGING SYSTEMS

(75) Inventor: Christopher Douglas Blair, South Chailey (GB)

(73) Assignee: Software Hot-House Ltd. (GB)

( * ) Notice: Subject to any disclaimer, the term of this patent is extended or adjusted under 35 U.S.C. 154(b) by 263 days.

(21) Appl. No.: 13/002,858

(22) PCT Filed: Mar. 6, 2009

(86) PCT No.: PCT/EP2009/052670
§ 371 (c)(1),
(2), (4) Date: Jan. 6, 2011

(87) PCT Pub. No.: WO2009/109657
PCT Pub. Date: Sep. 11, 2009

(65) Prior Publication Data
US 2011/0126126 A1    May 26, 2011

(30) Foreign Application Priority Data

Mar. 6, 2008  (GB) .................................. 0804164.2

(51) Int. Cl.
*G06F 3/01* (2006.01)
*G06F 15/16* (2006.01)
(52) U.S. Cl.
USPC ........................... 715/752; 715/758; 715/763
(58) Field of Classification Search
USPC ......................................... 715/752, 753, 758
See application file for complete search history.

(56) References Cited

U.S. PATENT DOCUMENTS

| | | | | |
|---|---|---|---|---|
| 5,923,327 | A * | 7/1999 | Smith et al. | 715/784 |
| 6,895,426 | B1 * | 5/2005 | Cortright et al. | 709/206 |
| 7,191,221 | B2 * | 3/2007 | Schatz et al. | 709/206 |
| 7,503,007 | B2 * | 3/2009 | Goodman et al. | 715/758 |
| 7,516,186 | B1 * | 4/2009 | Borghetti et al. | 709/206 |
| 7,627,828 | B1 * | 12/2009 | Collison et al. | 715/752 |
| 2004/0199598 | A1 * | 10/2004 | Kalfas | 709/207 |
| 2005/0066070 | A1 * | 3/2005 | Klassen et al. | 710/1 |
| 2005/0114458 | A1 * | 5/2005 | Gottlieb | 709/206 |
| 2005/0193345 | A1 * | 9/2005 | Klassen et al. | 715/751 |
| 2006/0026244 | A1 * | 2/2006 | Watson | 709/206 |
| 2006/0031324 | A1 * | 2/2006 | Chen et al. | 709/206 |
| 2006/0221957 | A1 * | 10/2006 | Ozawa et al. | 370/389 |
| 2007/0271340 | A1 * | 11/2007 | Goodman et al. | 709/206 |
| 2007/0282956 | A1 * | 12/2007 | Staats | 709/206 |
| 2008/0021966 | A1 * | 1/2008 | Asami | 709/206 |
| 2008/0126951 | A1 * | 5/2008 | Sood et al. | 715/752 |
| 2008/0168347 | A1 * | 7/2008 | Hallyn | 715/700 |
| 2008/0235334 | A1 * | 9/2008 | Gupta et al. | 709/206 |
| 2008/0256107 | A1 * | 10/2008 | Banga et al. | 707/102 |
| 2008/0309617 | A1 * | 12/2008 | Kong et al. | 345/157 |
| 2009/0094668 | A1 * | 4/2009 | Corbin et al. | 726/1 |
| 2009/0119678 | A1 * | 5/2009 | Shih et al. | 719/313 |
| 2009/0183112 | A1 * | 7/2009 | Higgins et al. | 715/808 |

* cited by examiner

*Primary Examiner* — Daeho Song
(74) *Attorney, Agent, or Firm* — Galvin Patent Law LLC; Brian R. Galvin

(57) ABSTRACT

Methods, systems, and apparatus, including computer program products, for handling a plurality of communications between parties. In an aspect, the presentation of both realtime and "store and forward" interactions are presented in a way to make it easier for a user of the system to read and understand what is being communicated, by whom, and to whom.

9 Claims, 22 Drawing Sheets

```
Return-Path: <tim.headman@obscureurl.com>
Delivery-Date: Tue, 26 Feb 2008 15:39:06 +0100
Received: from moutng.kundenserver.de (moutng.kundenserver.de [212.227.126.177])
    by mx.kundenserver.de (node=mxeu15) with ESMTP (Nemesis)
    id 0MKx9w-1JU0xQ4A4c-00007n ; Tue, 26 Feb 2008 15:39:05 +0100
Received: from [192.168.29.15] (i-83-67-25-19.freedom2surf.net [83.67.25.19])
    by mrelayeu.kundenserver.de (node=mrelayeu4) with ESMTP (Nemesis)
    id 0ML21M-1JU0xQ1dw5-0006il; Tue, 26 Feb 2008 15:39:00 +0100
Message-ID: <47C42483.4080403@obscureurl.com>  ⌐183
Date: Tue, 26 Feb 2008 14:38:59 +0000
From: Tim Headman <tim.headman@obscureurl.com>
User-Agent: Thunderbird 2.0.0.9 (Windows/20071031)  ⌐199
MIME-Version: 1.0
To: John Doe <john.doe@obscureurl.com>
CC: jane.smith@obscureurl.com, sam.outsider@spec2u.co.uk,
    joe.brown@obscureurl.com, mike.consultant@softwarehothouse.com,
    mary.white@obscureurl.com, jack.black@obscureurl.com  ⌐184
Subject: Re: Sales Meeting
References: <47C3E3A5.3020303@obscureurl.com> <47C3E2A0.8000909@obscureurl.com>
    <47C3E3A5.5010302@obscureurl.com>
In-Reply-To: <47C3E3A5.5010302@obscureurl.com>  ⌐185
Content-Type: text/plain; charset=ISO-8859-1; format=flowed
Content-Transfer-Encoding: 7bit
X-Provags-ID: V01U2FsdGVkX18N03hnO0XhHUFdvE+ACEDrp/qjGIK3d2oQa6M
    UvHXLbp8NACwAFTTqqEUeVAw8mBL7xPFZAekFYIOUmngJOxhZP
    xmhu6s81/5DY1FwzcoMKm+o9shy7N0W7sK8e+tWaGirwOJNYx9
E/A==
Envelope-To: john.doe@obscureurl.com
John Doe wrote:
```

```
> Let's get our ducks in a row within the
> marketing group first then
> take it wider.
>
> Tim Headman wrote:
>> John Doe wrote:                                    ⌐201
>>> Folks,
>>>
>>> I'm thinking about setting up a review of new
>>> product progress in the Western region.
>>> Shouldn't we look at Eastern while we're at it?
>>> Is everyone going to be ready by next
>>> Monday?
>>>
>>> Thanks
>>> John
>>>
>> We need to invite the Western region sales
>> manager too I think.
>>
>> Regards
>> Tim
I disagree. I think we need to have him in from
the start.
```

FIG. 6

| | Subject: | Sender: | Recipient | Date |
|---|---|---|---|---|
| | Mail delivery failed: returning message to sender | Mail Delivery System | john.doe@obscureurl.com | 18:01 |
| | Next Week | Jane Smith | John Doe | 18:02 |
| | Return Receipt (displayed) -- Sales Meeting | tim.headman@obscureurl.com | John Doe | 18:03 |
| ⇨ | Re: Sales Meeting | Tim Headman | John Doe | 18:04 |
| | Return Receipt (displayed) -- Sales Meeting | jane.smith@obscureurl.com | John Doe | 18:04 |
| | Return Receipt (displayed) -- Sales Meeting | sam.outsider@spec2u.co.uk | John Doe | 18:05 |
| | Support Contract Renewal | Sam Outsider | John Doe | 18:06 |
| | Mail delivery failed: returning message to sender | Mail Delivery System | john.doe@obscureurl.com | 18:09 |
| | Return Receipt (displayed) -- Re: Sales Meeting | tim.headman@obscureurl.com | John Doe | 18:09 |
| | Return Receipt (displayed) -- Re: Sales Meeting | joe.brown@obscureurl.com | John Doe | 18:15 |
| | Return Receipt (displayed) -- Sales Meeting | joe.brown@obscureurl.com | John Doe | 18:15 |
| | Return Receipt (displayed) -- Sales Meeting | mary.white@obscureurl.com | John Doe | 18:17 |
| | Month end figures | Mary White | John Doe | 18:18 |
| | Return Receipt (displayed) -- Re: Sales Meeting | mary.white@obscureurl.com | John Doe | 18:18 |

244 ⌐

243 ⌐

| | Subject: | Sender: | Recipient | Date |
|---|---|---|---|---|
| | Mail delivery failed: returning message to sender | Mail Delivery System | john.doe@obscureurl.com | 18:01 |
| | Mail delivery failed: returning message to sender | Mail Delivery System | john.doe@obscureurl.com | 18:09 |
| | Next Week | Jane Smith | John Doe | 18:02 |
| ⊟ | Return Receipt (displayed) -- Sales Meeting | tim.headman@obscureurl.com | John Doe | 18:03 |
| | Return Receipt (displayed) -- Sales Meeting | jane.smith@obscureurl.com | John Doe | 18:04 |
| | Return Receipt (displayed) -- Sales Meeting | sam.outsider@spec2u.co.uk | John Doe | 18:05 |
| | Return Receipt (displayed) -- Sales Meeting | joe.brown@obscureurl.com | John Doe | 18:15 |
| | Return Receipt (displayed) -- Sales Meeting | mary.white@obscureurl.com | John Doe | 18:17 |
| | Re: Sales Meeting | Tim Headman | John Doe | 18:04 |
| | Support Contract Renewal | Sam Outsider | John Doe | 18:06 |
| ⊟ | Return Receipt (displayed) -- Re: Sales Meeting | tim.headman@obscureurl.com | John Doe | 18:09 |
| | Return Receipt (displayed) -- Re: Sales Meeting | joe.brown@obscureurl.com | John Doe | 18:15 |
| | Return Receipt (displayed) -- Re: Sales Meeting | mary.white@obscureurl.com | John Doe | 18:18 |
| | Month end figures | Mary White | John Doe | 18:18 |

| Date/Time | Subject | ⊘△▽ | From | To/cc-Internal | To/cc External |
|---|---|---|---|---|---|
| 18:01 | Sales Meeting 1 FAILED | ● | Jane S | ME | Mike Consultant ... |
| 18:02 | Next Week | | | ME | ... |
| 18:04 | Sales Meeting 2: We need... | ● | | Tim, Joe B, Jane S ... | ... |
| 18:04 | Sales Meeting 1 VIEWED | ● | | Jane S ... | ... |
| 18:05 | Sales Meeting 1 VIEWED | | | | Sam Outsider ... |
| 18:06 | Support Contract Renewal | | Sam Outsider | ME | ... |
| 18:09 | Sales Meeting 3 FAILED | ● | | Tim ... | Mike Consultant |
| 18:09 | Sales Meeting 3 VIEWED | ● | | Joe B ... | ... |
| 18:15 | Sales Meeting 1,2 VIEWED | ● | | (ME), Jane S ... | ... |
| 18:18 | Month end figures | | Mary W | Mary W ... | |
| 18:18 | Sales Meeting 1,2 VIEWED | ● | | | ... |

FIG. 12

| Address 151 | # 161 | Inits 152 | Familiar 164 | Formal 153 | Forename+ 154 | Full 155 | Other 156 |
|---|---|---|---|---|---|---|---|
| John.doe@obscureurl.com | 154 | JD | John | J Doe | John D | John Doe | Big John |
| jane.smith@obscureurl.com | 123 | JS | Jane | J Smith | Jane S | Jane Smith | |
| joe.brown@obscureurl.com | 54 | JB | Joe | J Brown | Joe B | Joe Brown | |
| jane.sykes@bigco.com | 23 | JS | Jane | J Sykes | Jane S | Jane Sykes | |

FIG. 22

ENHANCEMENTS TO UNIFIED COMMUNICATIONS AND MESSAGING SYSTEMS

CROSS-REFERENCE TO RELATED APPLICATIONS

This application is a National Stage application under 35 U.S.C. §371 and claims benefit under 35 U.S.C. §119(e) of International Application No. PCT/EP2009/052670, filed on Mar. 6, 2009, which claims priority to United Kingdom Application Serial No. 0804164.2, filed on Mar. 6, 2008, each of which applications are incorporated herein in their entirety.

BACKGROUND

The invention relates to a system and method of handling a plurality of communications between parties. Novel approaches to the presentation, storage and creation of both real-time and "store and forward" interactions are presented.

"Unified Communications" (UC) Systems are well known. These integrate a variety of disparate communication methods—including, but not limited to, telephony, cellular text messaging ("SMS"), web-chat (or "instant messaging") and email—so that users need not access each one separately. Features of such systems typically include (a) forwarding of calls from one device, number or media to another, (b) a common message store, (c) access to a plurality of such channels from a single device or application.

A common approach to the presentation of messages of a variety of types has been to use an application that was designed originally for email. Voice recordings and video recordings are typically transported and stored as "attachments" using standards such as MIME (Multipurpose Internet Mail Extensions). The way in which a series of messages is presented to the user has changed little from the days when people checked their email once every few days and would converse with a relatively small number of people at a time.

Today, many workers carry email enabled telephones or other mobile communication devices. This encourages much more rapid and frequent responses from a wider set of individuals than before. However, most messaging applications continue to show a simple list of messages with a relatively small number of columns. The user can typically click on a column header to sort the list according to that column. While this allows messages to be seen chronologically or by subject it is not good at helping the user to grasp quickly what has been "said" by whom, to whom and when.

Furthermore, the common practice of including the text of a received email within the reply to that email leads to very long messages—much of which is duplicating one or more other messages already received. This makes it harder for the recipient to identify the new or changed information within each exchange of messages.

The list of addresses on an email is often shown in a very limited space—making it impossible to see the entire list without scrolling through it, a few at a time. This makes it difficult to appreciate who has seen the message and who has been added to or dropped from the list of recipients.

When messages include audio, this is often shown simply as an attachment—above, below or to one side rather than in the logical flow of the email. This is therefore difficult to place in context. It is also difficult to appreciate, at a glance, whether the attachment represents a few seconds or many hours of material.

SUMMARY

An object of this invention is to provide a system and method better suited to the sending, assimilating and responding to the rapid-fire, many-way, multimedia interactions that are increasingly common in business interactions.

Accordingly, this invention provides a system and method for presenting messages, whether sent or received, in such a way that the reader can more quickly identify the course of the discussion to date and can respond more easily and effectively.

Throughout this specification, the exchange of a plurality of messages that relate to a particular topic is referred to as a "thread". Threads may "split" or "diverge" into "sub-threads"—for example when a user replies to a subset of the original recipients and that group continue to exchange messages. Threads may later "merge"—for example when someone then forwards a response to all of the original recipients.

Each such "thread" consists of one or more constituent interactions—which may be "messages" or genuine live interactions in the case of real-time (e.g. telephony) or near real-time (e.g. instant messaging) media.

Those involved in such a thread are referred to as the "participants". An individual (or automated address representing an endpoint) may be the sender of, recipient of or merely "copied" ("cc") or "blind copied" ("bcc") on a particular message.

The present invention includes:
a) Means for presenting the list of participants in the thread more efficiently.
b) Means for reducing duplication of information presented
c) Means for presenting the chronology and/or involvement of different participants in a "thread" and constituent "sub-threads".
d) Means for encouraging the use of the most appropriate available medium for contacting said participants.
e) Means for recording real-time or near real-time interactions as these are undertaken.
f) Means for viewing, editing and/or annotating said recordings
g) Means for sending said recordings to some or all of the participants
h) Means for recording "voicemail" that allow said voicemail to be sent to multiple participants An embodiment of the present invention may incorporate any subset of the above features.

In general, one aspect of the subject matter described in this specification can be embodied in methods that include the actions of identifying address data for an interaction, the address data defining participant addresses for a plurality of participants in the interaction; categorizing a first set of one or more participant addresses as belonging to a first addressing category that is defined by a preference associated with a viewer; identifying corresponding display text for each of the participant addresses in the first set for display within a display space defined by a first boundary; categorizing each of the participant addresses in the first set as belonging to an initiator category or one or more other participant categories; associating a first graphical attribute with the display text of the participant address belonging to the initiator category; associating a corresponding second graphical attribute with the display text of the participant addresses belonging to the one or more other participant categories; wherein each graphical attribute causes its associated display text to be displayed in a manner indicative of the category to which the participant address associated with the display text belongs; and displaying the corresponding display text according to their corresponding graphical attributes within the display space, the display space displayed within a representation of the interaction. Other embodiments of this aspect include corresponding systems, apparatus, and computer program products.

Another aspect of the subject matter described in this specification can be embodied in methods that include the actions identifying a plurality of interaction threads; and for each interaction thread: identifying a corresponding plurality of constituent interactions, each constituent interaction having a common portion of a subject line; associating a graphical attribute with a subject field for the interaction thread, the graphical attribute being specific to the interaction thread; and displaying the subject fields of the constituent interactions according to the associated graphical attribute. Other embodiments of this aspect include corresponding systems, apparatus, and computer program products.

Another aspect of the subject matter described in this specification can be embodied in methods that include the actions of identifying address data for an interaction, the address data defining a plurality of participant addresses for a plurality of participants in the interaction; identifying alternate communication media, each alternate communication medium being associated with at least two participants in the interaction; displaying a representation of the interaction, the representation including a plurality of communication icons, each communication icon corresponding to an alternate communication medium and displayed according to a preference; and wherein a selection of a communication icon causes a communication to be established over the corresponding alternate communication medium. Other embodiments of this aspect include corresponding systems, apparatus, and computer program products.

The order in which method steps are listed is immaterial in most cases and does not imply a strict ordering of steps within the invention other than where such order is inherent in the steps. Where the figures describe specific mechanisms within the invention, these too may be performed in any order. Note specifically that the display or presentation of information may occur before completion of all of the steps. Other, (typically the slower), steps may be performed in parallel with or after the initial display and the display subsequently updated with the richer content that becomes available as those steps complete. Examples of this would be accessing a corporate directory or looking up icons to use instead of domain names.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6—Raw Message content of Message in FIGS. 4 and 5.
FIG. 9—Traditional email client presentation of a list of received emails.
FIG. 12—Alternative presentation to that of FIG. 10.
FIG. 22—Exemplary grid view presentation of for confirming and/or altering address abbreviations.

DETAILED DESCRIPTION

Participants in an Email Thread

Consider first, the presentation of the list of participants associated with a received message and one's own position within this list. The message will typically have come "From" a single individual or source and be sent "To" one or more recipient addresses. It may also have been copied for information ("cc:") to one or more addresses. It may also have been "blind-copied" ("bcc:") to one or more addresses. The "blind copy" list, by definition, is not normally visible to other recipients though it is advantageous to be aware that one has only been blind-copied on a message.

Figure 1:
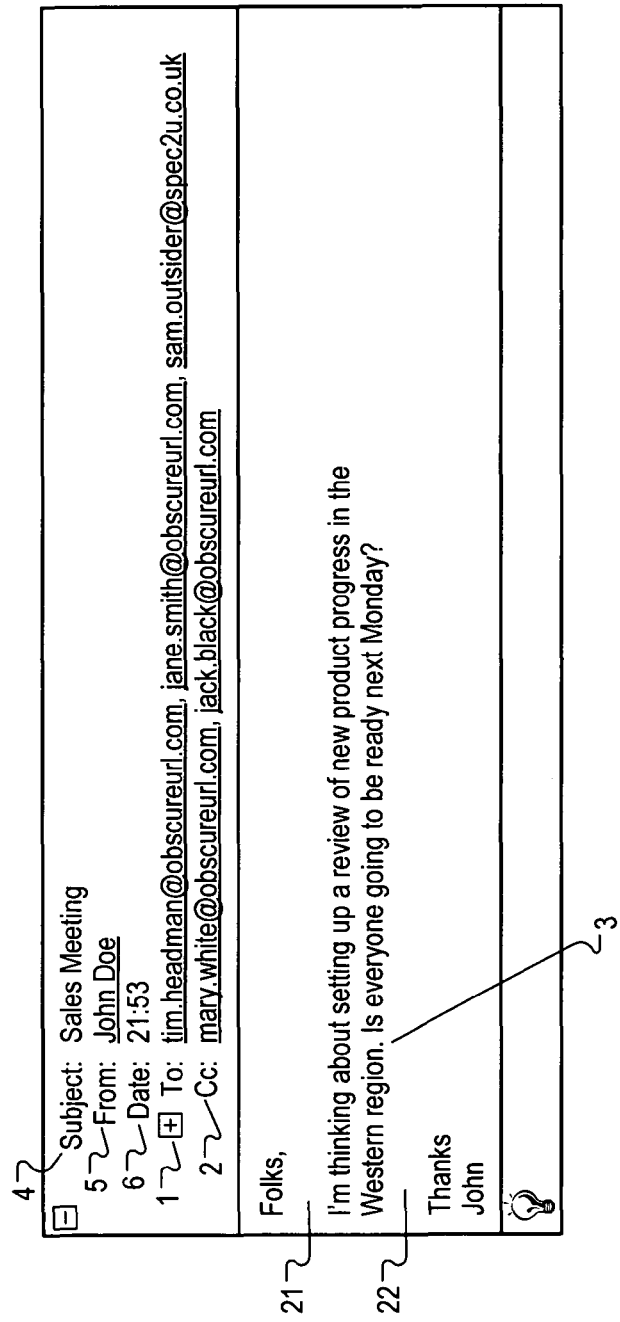
FIG. 1—Traditional email client presentation of a received email.

FIG. 1 shows a simple E-mail as printed by a typical application. Notice the long list of "To:" (1) and "cc:" (2) addresses. As printed, the full extent of the "To:" list (1) is not visible unless the user clicks on the "+" symbol to expand it. On a device with limited display area, such as a handheld computer, or mobile communication device, the list would normally be in a scrollable area with only a small proportion visible at one time. Otherwise, the body (3) of the message would not be immediately visible—forcing the user to scroll down to see it. Other elements displayed typically include the Subject (4), Sender (5), date and/or time (6)

Figure 2:
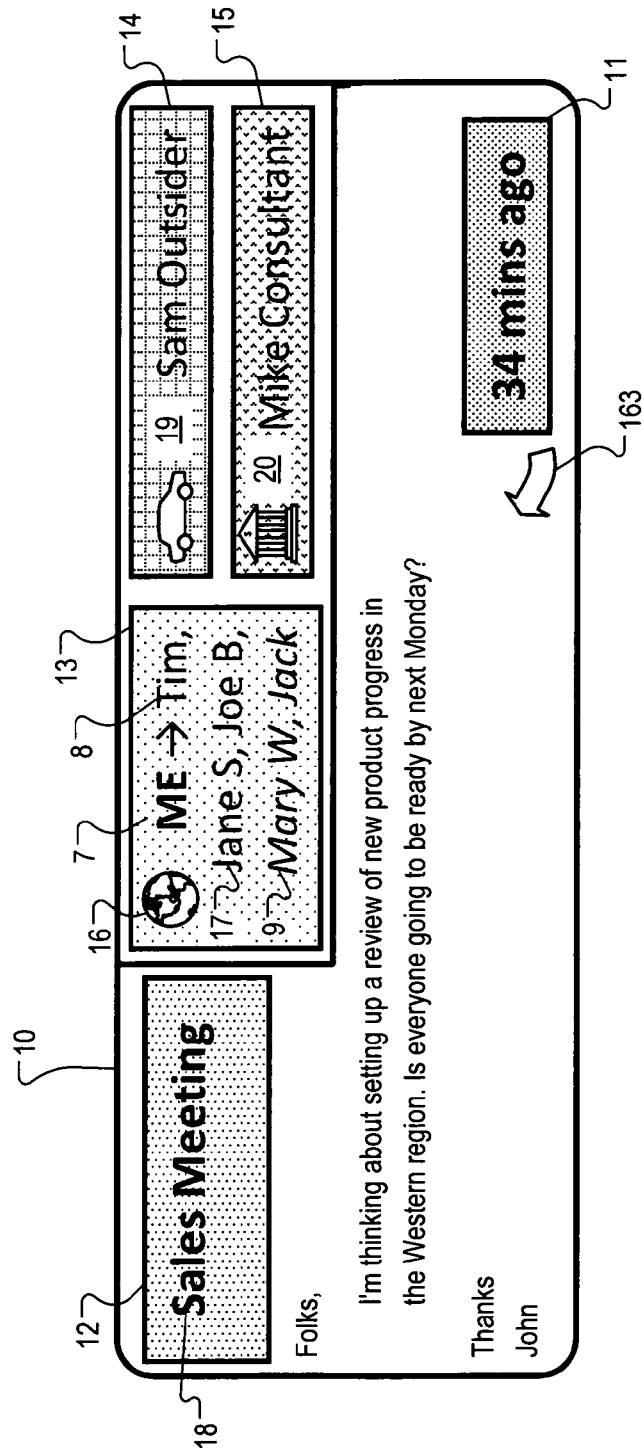
FIG. 2—Enhanced presentation of the email of FIG. 1.

FIG. 2 shows the same email displayed using an example embodiment of the invention. In FIG. 2, unnecessary labels are replaced by graphical conventions and devices ("graphical attributes") including:

i. Font style, size, weight and/or colour of display text. (Bold indicating "From" (7), normal text indicating "To" (8) and italics indicating "cc" (9) in this instance).
ii. Enclosing boxes (such as (10) which groups all participants together), table cells or other shapes. Such boundaries may optionally be configurable e.g. by dragging the lines, corners or resizing handles.
iii. Specific positioning (e.g. bottom right for date/time (11), top left for Subject (12)) further avoid the need for additional textual labels. Again, these may optionally be configurable as system-wide and/or individual preferences. Optionally, users can drag and drop and resize elements to suit their way of working and the space available to them.

iv. Shape, texture, fill gradient, 3-dimensional effects, etc., as indicated by the different fill patterns in each of the enclosing boxes.

v. Graphical icons and/or popup (e.g. Alt-tag) text explaining the graphical icons.

The above, non-exhaustive list of means for distinguishing and displaying fields within the display to suit a viewer's or a viewer's company's means of working is applicable to all features and display elements described below but is not repeated unnecessarily so as to avoid repetition.

Additionally, improved grouping and reduced text for participants is achieved by:

i. Grouping of addresses according to one or more addressing categories, e.g., by domain (13), (14), (15).

ii. Use of company logos and/or colours where available instead of domain names, e.g., (16).

iii. Use of abbreviations (17) where these have been configured by the user and/or the participant—typically for those with whom they commonly converse.

iv. The user's own address defaults to an abbreviation of "ME". In some implementations, uppercase is preferred as it is more obvious when italicized than the mixed case "Me". Optionally, this address may be specifically highlighted (e.g. unique colour) to help the user spot it rapidly within a list of names. Similarly it may be brought to the front of a list to make it more visible even though alphabetical ordering would not place it first.

v. Optionally, where more participants are listed inside a single domain than can be shown within the allocated or desired area, a reduced set of participants may be shown with an expansion or scroll mechanism (such as the "+" symbol of FIG. 1) inside or next to each domain grouping.

vi. Where recipients are from many domains—such that there is not room to show all of these in the allocated or desired area (10), one or more domain groupings may be reduced to just the company logo. Holding the cursor over the logo may show the list of recipients within that domain. Clicking on a logo may expand that domain grouping to show the names within it.

vii. Where integration to a corporate directory or other means of determining organisational hierarchies is available, the names within the address areas may be linked so as to show reporting hierarchies. For example, a line with an arrow may be drawn pointing from an individual to their manager. In addition, information extracted from said directories may be presented when the user selects an address.

viii. Where participants are in different time-zones and this can be determined (e.g. permanent location from corporate directory; current location from instant messaging "presence" information) names may be grouped together according to time zone and/or an indication of this may be given e.g. by a small clock icon showing the time difference ("+5", "−2") superimposed or on a pop-up label. The latter may also or alternatively show the current time at their location.

Furthermore, the time of receipt can be optionally displayed:

i. This may show relative time (difference between now and the time of receipt) and/or absolute time of receipt (11).

ii. The background colour in this example may be red, amber, green or grey, or other colour combinations, as indicated by the different fill patterns, and is used to indicate adherence to agreed levels of service (respectively, "out of tolerance"; "close to tolerance"; "well within tolerance" and "don't care")—the thresholds for which may be triggered by sender, subject, priority, the user's personal goals or other attributes.

iii. Holding the cursor over this area (11) or otherwise selecting it will show the alternative display (relative time if absolute is showing and vice versa).

iv. Clicking on the field will toggle it to show said alternative display.

v. Right-clicking or otherwise selecting this area (11) will provide shortcuts to appropriate functions. For example: "Remind me tomorrow", "Send Apology for delay", "Escalate", etc.

Additional information not present in FIG. 1 can be added without using additional space. For example:

i. The subject text (18) can be colour coded, e.g., red, to indicate "urgent."

ii. The colour of the background (19), e.g., amber, as indicated by the first fill pattern, indicates an unknown external company.

iii. The colour of the background (20), e.g., light green, as indicated by the second fill pattern, indicates a known, friendly partner company.

iv. The reader's own domain will typically be shown in that company's signature colour background (13), e.g., green, as indicated by the third fill patterns.

v. Specific colours, shapes or styles may be allocated to specific domains, as indicated by the various fill patterns.

Additionally, whitespace can optionally be removed, including:

i. Wholly blank lines such as (21) and (22) on FIG. 1.

ii. Automatic reuse of partially blank lines (in this example, at top right by the recipient details (10) and bottom right by the date/time (11)).

iii. Conversion of fixed pitch fonts to more efficient proportionally spaced ones. Preferably, the presence of tab characters or multiples spaces may be taken as an indication of attempts at manual formatting—for which fixed pitch is important and hence the application may leave the fixed pitch font untouched.

iv. Conversion to a standard font size. Optionally, the user may specify a preferred font size and type and whether all messages should be converted to this; none or only those containing a single font.

Optionally, a control (163) may be present that, when clicked, returns the message to its original form—allowing the user to see the impact of any of the parsing and optimization that the application has performed. Should the message already be shown without such optimization, this control may be disabled or invisible. Alternatively, it may operate as a toggle. For example a user that prefers to see messages in their original state initially may occasionally click on this tool to condense a particularly long message or one with many blank lines.

Optional optimization of field width (such as is performed by browsers when displaying HTML tables) can be used. Column width adjusts automatically to suit the contents of the fields—such as the subject (12) and Address fields (18), (10).

Many users are unaware of and do not experiment with features such as right-click. Hence the system may use means of encouraging users to do so. For example, an icon may be used to highlight a "tip" such as "click here to set an abbreviation for this frequently used name". Alternatively, a status bar, panel, scrolling ticker or other display area may show such tips.

The overall effect of these enhancements is to reduce the amount of text on screen while maintaining or even increasing the amount of information provided. In this example, the full address list; message priority; company relationship and service level warning are shown—none of which were present in FIG. 1. This helps the user to read and assimilate the message more quickly and better understand how and when to respond yet with less need for scrolling or other interaction with the display than in the standard display of FIG. 1.

Preferably, the configuration, style, position and content of each of these fields are user definable. Preferences will typically be set to a company-wide default and individuals given some degree of freedom over their personal layout and style preferences. This approach is implicit anywhere that "preferences" are discussed below.

On initial installation, or on request, the application may examine existing public, corporate and/or personal directories/address books and any existing message stores that the user configures. By looking at previous messages, the application can identify those addresses with whom the user interacts—and how frequently. By grouping these into domains and ranking according to frequency/volume of interactions, the system can identify those addresses that it is worth the user specifying abbreviations for. By using the directory information and/or greetings (e.g. "Dear Tim") and/or sign-offs/electronic signatures, the application can show a list of the relatively few addresses that make up the bulk of the recipients. A pareto (80/20) rule typically applies with 80% or so of messages involving around 20% of the addresses.

In some implementations, the system identifies the greeting used for each recipient from existing mail messages sent from this user to said recipient (e.g. "Dear Tim" versus "Dear Miss Brown") to determine whether first name or surname is used. A list of likely preferred abbreviations is therefore built. Preferably, further processing of this list identifies any duplicates within the list and assigns the simpler name to the more frequently used address. The other(s) are then distinguished using the first initial or initials of the surname.

In some implementations, the user is presented with a suggested list of abbreviations, such as in the grid view such as that of FIG. 22. This figure shows a simplified version of the form used for confirming and/or altering address abbreviations. This may be shown at installation time or under a menu item, toolbar button or similar command. This is also useful should the user need to check who a particular abbreviation has been assigned to. Standard grid features, such as sortable columns, scroll-bars etc. have not been shown but would normally be present.

The first column (151) shows the full email address of the individual. A further column (161) shows the number of messages exchanged with this individual—or, optionally their ranking when addresses are ordered with respect to the number of messages exchanged. The central columns (152), (164), (153), (154), (155) show automatically derived options for abbreviations. The final column (156) allows the user to enter their own alternative—such as a nickname (156). One cell in each row is selected (e.g., (160), (159)) with the initial selections preferably being set according to an analysis method such as that outlined above. The user may change any of the default settings with a single click on their preferred cell (or, in the case of a user entered alternative, a click followed by entry of the required abbreviation). Note that these same options may be provided on a right-click menu item when pointing at an individual address in any of the displays shown in other Figures. This makes it very easy for the user to refine the abbreviations they use as new addresses start to appear or as previously unusual contacts become regular correspondents.

Preferably, the system highlights and avoids the use of duplicate abbreviations. Duplicated entries are clearly marked (e.g. with "equals" sign (158)) as a warning that using this abbreviation would be ambiguous or, if one of them is already in use, a colour coded or other visually distinct type of "equals" sign (165), e.g., a red "equals" sign) so the user knows to avoid this one. If the user does choose such an abbreviation for one of the potentially many addresses to which it could refer, this too is clearly highlighted (e.g., another colour coded or visually distinct type of "equals" sign (157), e.g., a green "equals" sign). Alternatively, ambiguous options may be disabled or greyed out but as the address list evolves over time, it is inevitable that a selected abbreviation may become ambiguous later hence the application would normally only block choices that conflicted with an existing abbreviation at the time the choice was made. Abbreviations are therefore unique for a given user's contact list at all times. Should a new contact be added to the list of addresses, the system will ensure that a unique abbreviation is used—with the fallback position being to use the full address as the "abbreviation".

In some implementations, conflicts may be resolved taking into account the domain name. For example, where two or more addresses with forename "John" are found, one being in the same domain as the user and the other(s) external, the former would automatically be assigned "John" by default and the other(s) would use part or all of the surname in addition to "John" or "J"+surname.

System-wide and/or personal preferences may be configured to indicate the preferred order in which abbreviations are selected (e.g. Familiar, then Initials, then Formal)

Figure 3:
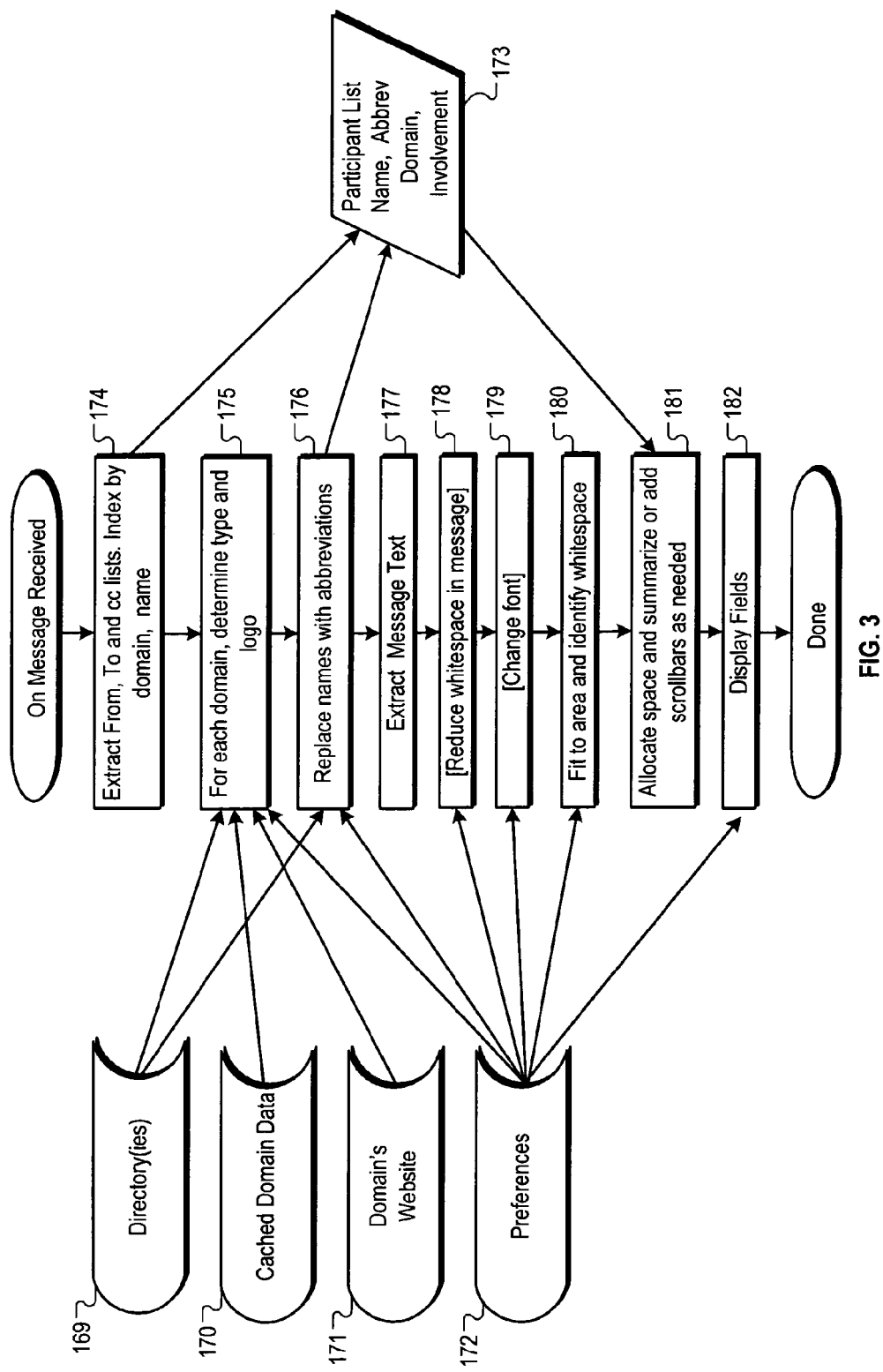
FIG. 3—Flow diagram of an exemplary method by which the presentation of FIG. 2 may be derived.

FIG. 3 is a flow diagram of an exemplary method by which the sender's and recipients' addresses have been analyzed and processed for display as shown in FIG. 2. The method can be implemented in a client device, such as mobile communication device or personal computer, or can optionally be implemented an application server (143) of FIG. 21, or distributively implemented between a client device and the application server (143), and is operative to generate display data that causes a client device to display an environment as shown in FIG. 2.

The total set of known participants is extracted from the message (174). These addresses are parsed (either side of the "@" sign) into name and domain. Addresses are stored locally (173) and sorted, grouped and/or indexed according to the domain from which they come. Each participant's role is noted—To, From, cc, bcc etc.

For each domain in which there are one or more participants, the way in which the domain should be displayed is determined (175). One or more directories and/or preference settings may identify the domain as "internal", "partner", "customer" or other category—each of which corresponds to a display style and higher level grouping of domains. A logo is next identified for the domain—ideally an existing, cached one (170) otherwise one is retrieved from a directory (169), preference settings (172) or, usually as a last resort, these may be obtained from the well-known method of retrieving the file "favicon.ico" from the domain's website (171). Where an icon cannot be determined, the textual name of the domain may be used or an icon of, for example, a question mark. The "alt" tag associated with the icon is normally set equal to the name of the domain and may also include the aforementioned "category". Optionally, the icon may also be a hot-link to the website of the domain. These added features allow the user to place his cursor over an unfamiliar icon and see the name or to click on it and open a browser window onto their website. Domains may then be ordered according to how they are used within the message and/or to their relationship to the reader's domain. For example, the first (typically top, left) domain to be shown may be that of the sender. The next (if different) may be that of the recipient. Then those including at least one "to" address followed by those only including "cc" addresses.

As the address is to be placed inside an area associated with a particular domain, there is no need to show the domain name against each address from that domain. Only the individual's name need be shown. Even this may be shortened for those individuals with whom the user interacts frequently. The preferred abbreviation for each name is determined (176) by reference to one or more directories (169) and/or preference settings (172). However, because the list of individuals with whom one interacts is constantly changing, it is often necessary to adjust said abbreviations. Hence the abbreviation (if any, the full name if not) is itself made a hot link. Clicking on or hovering over the name will bring up a number of options including the full name and domain; options to change the abbreviation to alternative, automatically derived abbreviations (e.g. forename only, initials, forename and first letter of surname etc.). It may also allow manual entry of a preferred abbreviation. Further items available on this pop-up list include details of and means for connecting to this user via any or all communication mechanisms that user is known or expected to support (as determined from previous interactions, directory information and/or preference settings). Further entries may include but are not limited to: current state or "presence information"; job function; reporting hierarchy. The latter may, for example, be used to position the names of two or more individuals such that reporting lines can be drawn between them. This makes it very clear, for example, that someone has addressed a message to an individual and also copied their manager.

The content of the message is extracted (177). Note that this and subsequent steps may be done in parallel with the above preparation of address fields. The content may be in plain text, HTML, Rich Text Format (RTF) or other file format for which an appropriate renderer may be needed.

If preference settings dictate, blank lines may be removed (178); tabs may be reduced to one or more spaces.

If preference settings dictate, the font style and size may be changed (179).

The message text can now be rendered within the available width and any whitespace at each corner may be determined (180)—for example by finding the largest rectangle that can be drawn from each corner without obscuring any message text.

The display space is then allocated (181) as follows. The textual addressing information to be displayed within each domain's containing area is determined. Rather than waste space with labels such as "From", "To" and "cc" each address may be highlighted according to which of these categories it is in. For example, those the message was "To" could be bold while "cc" could be italic or normal font. Text colour, background colour, font style, font size and various other graphical attributes can also be used to distinguish between these categories. Similarly, an indication may be given of receipt status, i.e., whether the recipients have received and/or read the message—as can be determined, for example, by the use an automated interpretation of read receipts. The space required for each domain display can then be calculated. This has to be combined with that needed for the message content, subject, date/time stamp and any other controls to be included. If preferences or display limits dictate that there is insufficient room to display all required fields, then an iterative process of reducing the size of address areas by placing one or more names under a linked control and/or applying scroll bars to one or more regions of the screen is used to determine an optimal layout. At a minimum, it would show the icon for each domain involved—so that a reader will be aware, for example, that one of their customers was sent the message. Failing to appreciate the audience of a message can be very dangerous. If there is then space available to show more information, those names with abbreviations are shown next—as these are likely to be shorter and also more relevant to the reader. By holding the cursor over, or otherwise selecting, an area showing addresses from a domain, the full list of addresses in that domain may be shown.

Fields are then displayed (182) within their bounding areas—noting that reuse of whitespace in corners may result in a "layered" view where some fields are overlaid on the underlying rectangle within which the message text is displayed. Note also that where relative time is chosen, a timer may be used to refresh this changing value—typically once a minute.

Exchange of Information within a Thread

The above example considered only the information presented in the "body" of a single message. Each time a message is responded to, the response frequently includes the whole of the previously received message—albeit typically with address information added and sometimes with formatting or indenting changes to differentiate it from the new response text. Each email application differs in how it does this and most give the user several options—such as whether their response starts above or below the original message.

Figure 4:
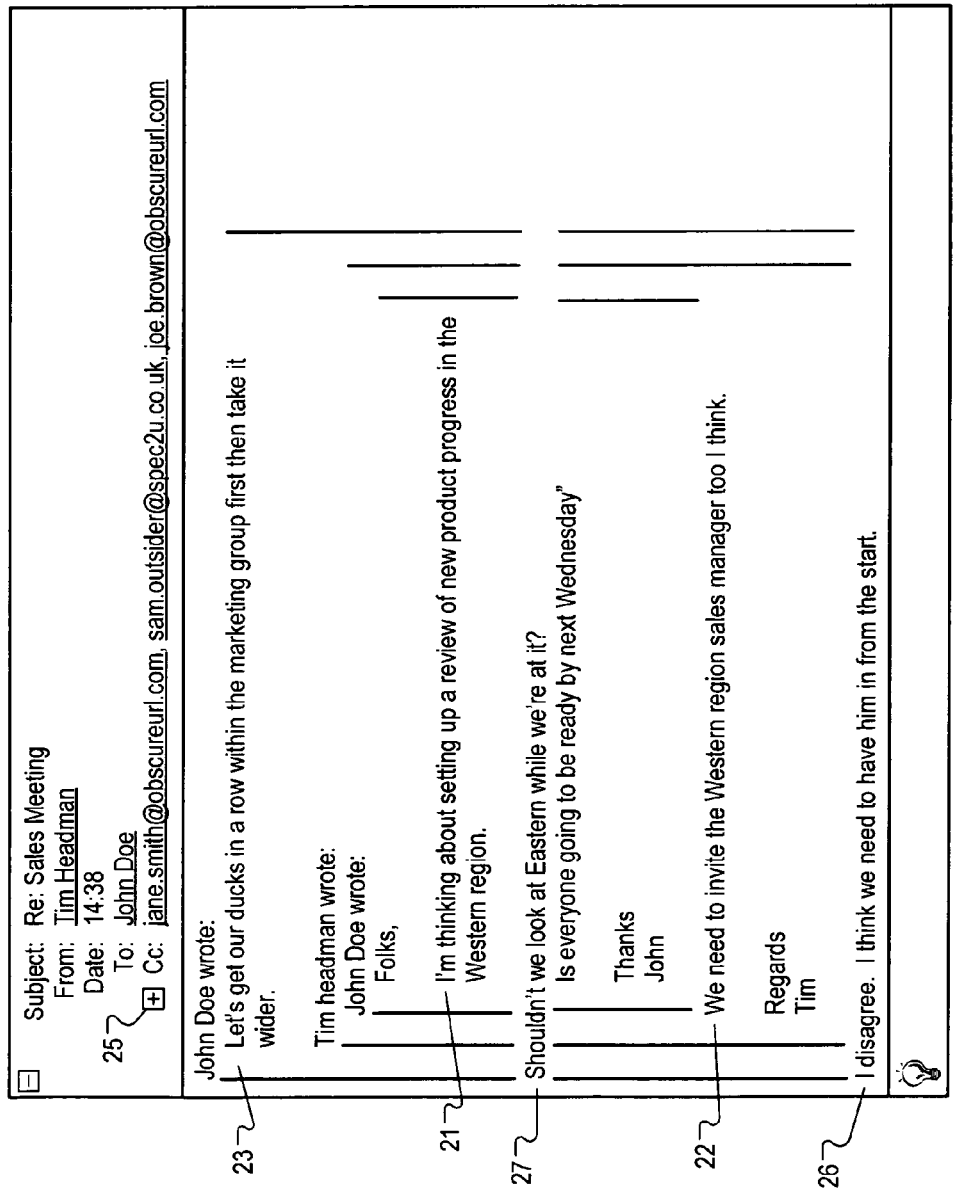
FIG. 4—Traditional presentation of an email after several responses.

FIG. 4 shows an example of how a typical email client would show the message of FIGS. 1 and 2 after three subsequent replies. In this case one user (Tim Headman) has configured his email client to place his response after the original text (22) and (26) while the other user (John Doe) has chosen to place his response before the original message text (23).

Note the following deficiencies of the display of FIG. 4:
i. It is difficult to follow the flow of the replies—particularly when a mixture of "before the original" and "after the original" preferences is used. In this case (26) is the response to (23) which is the response to (22) which is the response to the original message (21).
ii. Where a respondent types something (27) within a previous reply and/or the original message (21), this is difficult to identify—particularly on longer emails where the temptation is to view only the top or bottom of the text where responses are likely to be.
iii. Although they have in this case, not all users include the previous message within their response—yet this may be important for the recipient to see.
iv. Only part of the "cc" list is shown initially. The user must click on the "+" symbol (25) next to it to expand it and see the full list.
v. The original message's addressing (FIG. 1) made it clear that Mary White and Jack Black were being copied the message—it was not directed "To" them. Hence one could infer that they were being advised of the desire to have a sales meeting whereas the other recipients were actually being invited to it. This detail has been lost from the display of FIG. 4.
vi. It is not possible to infer from this display whether anyone else has seen some or all of the information within it. For example, an additional recipient could have been included on response (23) but was not included on this, latest, response (26). There could therefore be someone in the organisation that is aware of the thread of discussion but is not aware of the subsequent outcome and may mistakenly believe that response (23) was the final word on the matter.

vii. The times of the intermediate messages have been lost.
viii. Other, related messages are not referenced and can only be identified by looking at the list of incoming messages, such as out of office replies, failure to deliver notifications, "Read" receipts, and "Received" receipts.

The above "related messages" are collectively referred to hereafter as "supervisory messages". They are typically automatically generated, to a rigid format and convey a very specific meaning that is usually straightforward for an application to determine.

Figure 5:
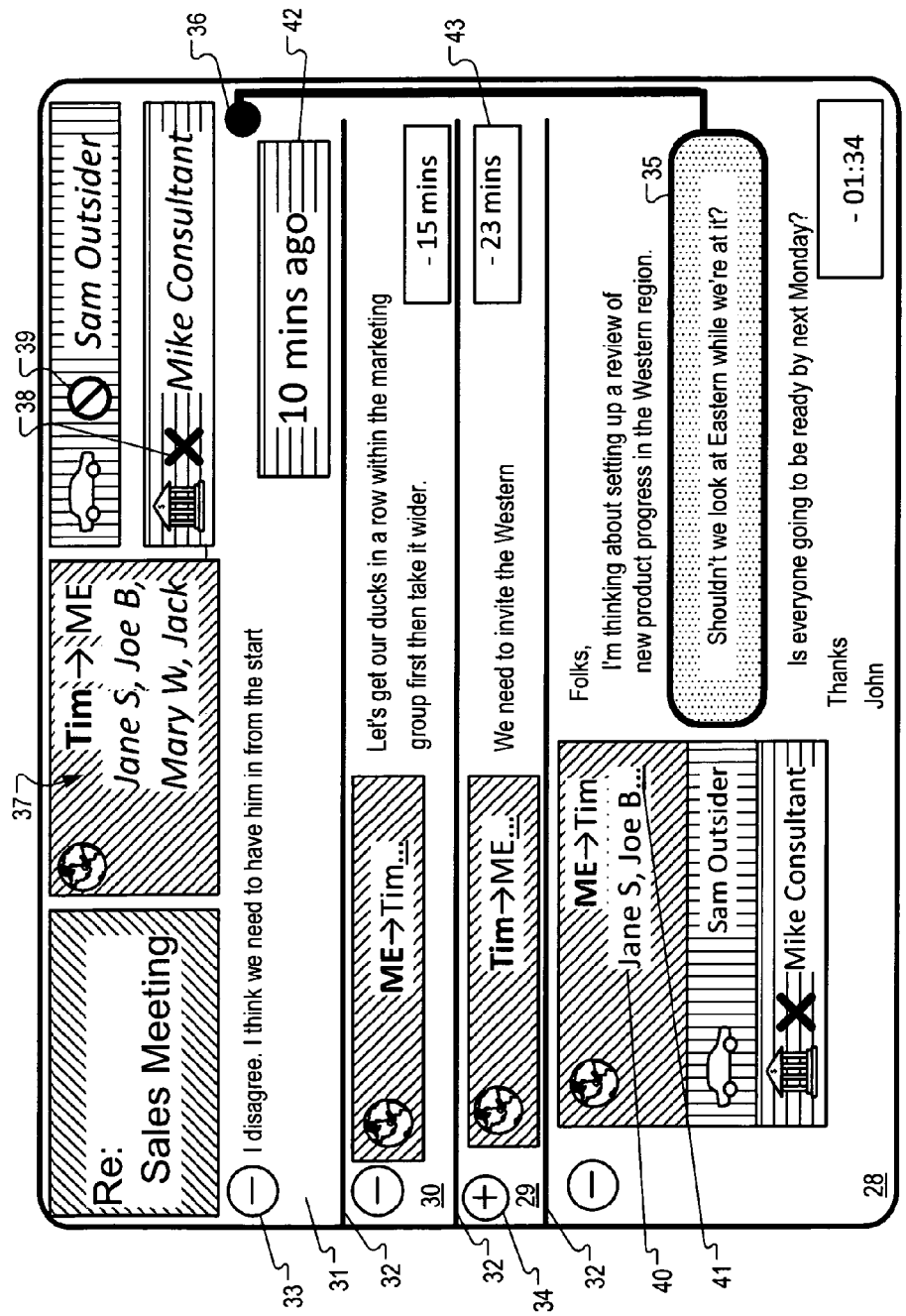
FIG. 5—Enhanced presentation of the email of FIG. 4.

FIG. 5 shows the same message as formatted by an example of the invention. In the message format of FIG. 5, the entire thread is shown—including the original message (28); intermediate replies (29) and (30) and the newly received response (31). In particular:

i. All constituent messages are shown, regardless of whether each was included in the most recent response.
ii. All constituent messages are shown in chronological order, regardless of individuals' preferences for showing response text before or after the previous text. The user may choose to have the original message at the top or the bottom of the list (the latter being shown in FIG. 4).
iii. The boundary of each constituent message is clearly delineated (32).
iv. Each constituent message can be expanded to show in full (or to a maximum preferred size, within which a scrollable area allows larger messages to be shown a part at a time) or collapsed to a single line summary as has been done here for an intermediate reply (29).
v. The user's preferences determine how many (if any) previous constituent messages are expanded by default. In this example, one is expanded (30).
vi. Optionally, a separate user preference setting determines whether the original message will be expanded by default or not. In this example it is expanded.
vii. The user may click on controls (33), (34) to expand or collapse a message respectively. In so doing, the control will toggle between (33) and (34) or vice versa.
viii. Those messages that have already been read (29) or were written by this user (28), (30) are distinguished from those that this user has not yet read. In this example, (31) has text in a stronger colour (black) than the other messages. For example, the text of other messages can be greyed out slightly.
ix. In a more complex exchange between more than two parties, intermediate messages may not have been read by this user. In this case, these would automatically be "expanded" even if the user preference is for such previous replies to be compressed.

In some implementations, when a respondent types something (27) inside the lines of a previous reply and/or the original message (21), one or more different features can be used to visibly distinguish the respondent's reply:

i. The reply highlighted—in this example, by a different font colour, background colour, boxing (35) and connector (36), as indicated by the first shaded pattern. The text, boxing (35) and connector (36) can be of the same colour, e.g., red.
ii. Should such an "insert" be made into a constituent message that would not otherwise be shown "expanded" (e.g. (29)) then its presence will automatically cause that message to be "expanded".
iii. Where the whole text of said expanded message is not wholly visible (e.g. scroll bars are needed) the scrollable area will be moved automatically so as to show the start of the inserted text.
iv. Where multiple inserts have been made into a constituent message, additional connectors may be shown (e.g. at bottom right of the surrounding box (35)). Clicking on said connector will scroll the text to the next insert.
v. The subsequent inserts may also show a connector back to the previous insert. Clicking on this will scroll the content to said previous insert.

The same techniques described for FIG. 2 are used to reduce the space taken up by addresses. In addition, visible features can indicate that multiple messages have now been exchanged and some of these may have been sent by this user:

i. Where Read Receipts have been requested, but not yet received, this is visibly indicated. For example, by greying out the text of said participants (37), or by some other visual indicator, such as underlining. Clicking on, hovering over, right-clicking or otherwise activating said indicator or participant name may show further details—such as time the message was read. It may also offer appropriate shortcut options triggered by the absence of aforementioned receipts such as "Resend to different address", "Resend to Superior"—the latter being possible where a corporate hierarchy has been or can be determined from a directory or manually configured organisational chart.
ii. If a "Mail delivery failed" message has been received, this indicates that an intended recipient has not received and will not receive it. This can be indicated by an icon (38) or other mechanism. Clicking on, hovering over, right-clicking or otherwise activating said indicator or participant name may show full details of the message—such as the reason for the rejection. It may also offer appropriate shortcut options such as "Resend to different address" etc.
iii. If an "Out of Office" reply has been received this may be indicated. For example, by an icon next to the individual's name (39). Clicking on, hovering over, right-clicking or otherwise activating said indicator or participant name may show the text of said Out of Office reply. It may also offer appropriate shortcut options such as "Resend to different address" etc.
iv. Each constituent message may optionally show only a subset of the full list of addresses it would show if it were to be presented in isolation. The subset is typically those addresses that differ from the message above (or below according to user preference). In this example we can see (40) that the original message was sent "To:" Jane S and Joe B (not in italics) and has been received by them (not greyed out or otherwise visibly distinguished) even though they are only being copied on the subsequent responses (as they are shown in italics in (37)).
v. To see the full list of recipients of a constituent message (or just those not already showing) the user may click on or otherwise select a control—shown here as an ellipsis (41). In the example shown, a differentiated colour of the ellipsis and underscore indicate an HTML link and hence signal to the user that this is a clickable control.

The time of each constituent message is shown (42), (43). In addition to the features of FIG. 2, an additional, third time representation is supported for the previous messages in the thread. This shows the time difference between successive messages (as shown by (43)). According to user preference this time span may be relative to current time; to the most recent message or to the preceding message.

In addition to a more efficient view of the latest response, FIG. 5 provides a single, consolidated view of the entire thread and hence avoids the need to see intermediate responses, Read Receipts, Out of Office Replies and Message Rejections.

FIG. 6 shows the raw message content as received by the email application for the message of FIGS. 4 and 5. To allow a larger font to be used, the text is broken into two containing frames but that on the right continues below that of the left as part of the same message.

Various fields within raw message are used to determine the information shown in FIG. 5. Note that much of the "missing" information discussed under FIG. 4 is typically still present in this user's (John Doe's) mailbox—as he will typically still have the original message in his inbox folder; his own responses in his Sent Mail folder and subsequent responses from Tim Headman also in his inbox.

Figure 7:
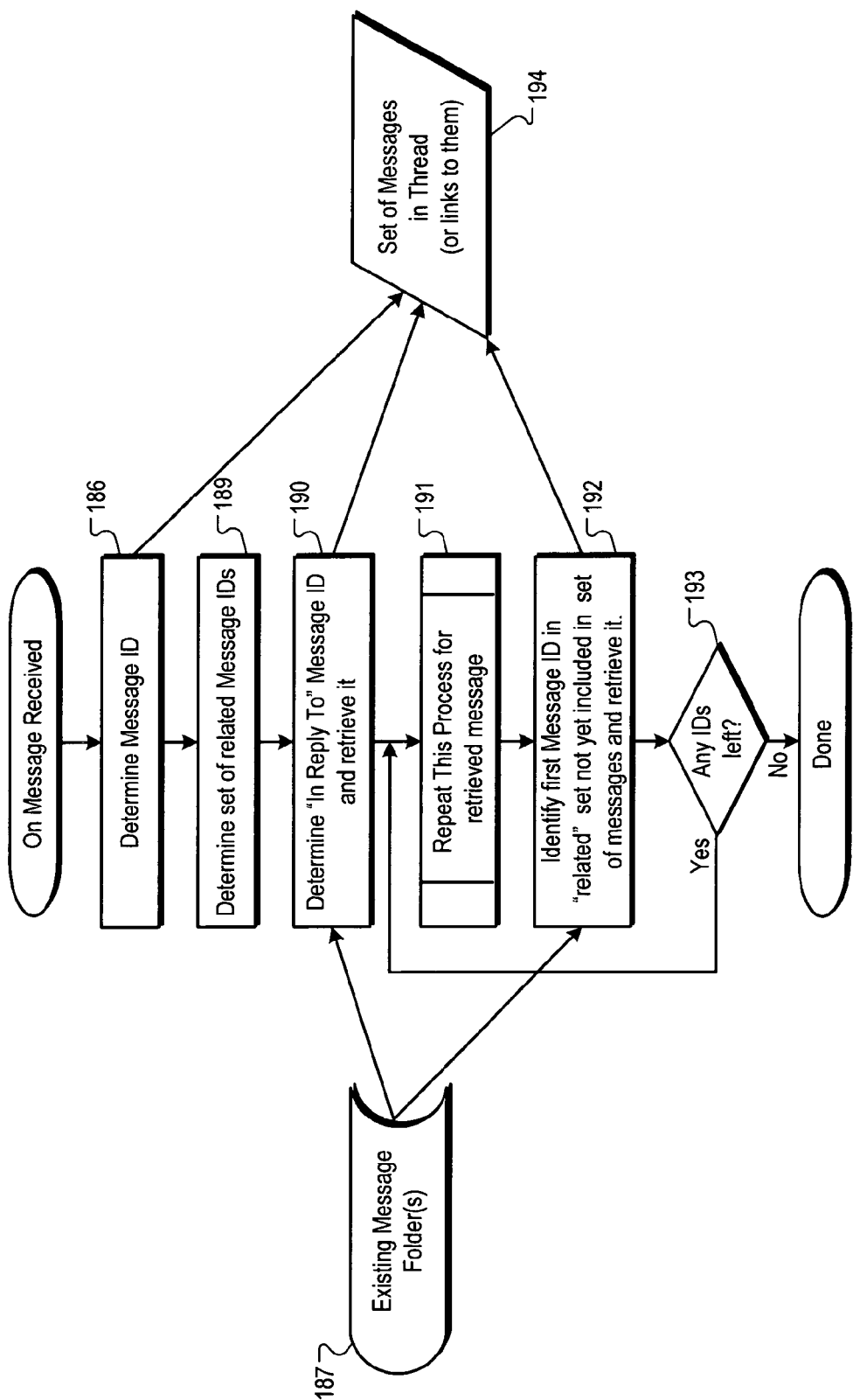
FIG. 7—Flow diagram of an exemplary method by which emails may be related and/or parsed.

FIG. 7 is a flow diagram of an exemplary method by which a received message may be matched with one or more previously received, sent or stored messages and an overall set of messages relating to the thread as a whole can be determined. Note that in addition or as an alternative to the use of the Message IDs shown in FIG. 6, the method may also insert hidden (or visible) information within the body of the message and/or additional header fields to facilitate the matching of messages to threads as described below.

Using this process on all received messages, including Out of Office Replies, Delivery Failure Notifications, Read receipts, etc., it is possible for a system to group all received emails into the appropriate threads. The method can be implemented in a client device, such as mobile communication device or personal computer, or can optionally be implemented an application server (143) of FIG. 21, or distributively implemented between a client device and the application server (143).

The method of FIG. 7 builds the set of messages in each thread as follows according to the following steps. The ID of the newly received message is extracted (186) from the MIME content (183). If this message is not already known and stored in a "thread" (194) then a new "thread" is created and this message is placed in it.

The set of all related message IDs is extracted (189) from the MIME content (184) and held in memory.

The ID of the message (if any) that this newly received message was a response to is extracted (190) from the MIME content (185). The system then attempts to locate within the existing sets of messages already assigned to threads. Should it find the message already in a thread, then this message is also assigned to that thread rather than continuing to build a new set of messages for a new thread. If the message is not already known as part of a thread, the system accesses the message store(s) (187) to which it has access. If the message can be found, then the process of FIG. 7 is repeated (191) for that message. This recursive process ensures that threads are fully populated even if the application is introduced after several messages have been sent in a thread and hence are not yet linked together.

The recursive processing of the "In Reply To" message is likely to have resulted in most, if not all, of the other Message IDs being added to the set of messages in the thread. However, if any of these IDs are not present, one is selected (192) and the same recursive process (191) applied to it as was done for the "In Reply To" message.

When all related messages have been processed as indicated by a negative decision for the presence of remaining Message IDs (193), the set of messages should be a complete representation of the related messages within a thread.

To avoid indefinite looping, in some implementations, a maximum depth and/or number of messages in a thread may be set. On reaching such a limit the method will no longer make recursive calls.

Where related messages are not accessible or where Message IDs are not available, the system may classify messages to threads using other schemes, such as:

i. Comparing the subject of the message in question with that of previously sent, received or stored messages or those already grouped according to the invention. Preferably, this matching process takes into account the presence of common prefixes such as "RE:" or "FW:" that signify a reply or forwarding of a message. More preferably the algorithm also eliminates changes to the "subject"—such as the insertion of well-known strings such as "SPAM?".
  ii. To provide better discrimination, particularly in cases where the same subject line is used for multiple threads, the list of recipients and/or sender may be used to further differentiate and group messages.
  iii. The body of the messages may be compared. On finding the body of one message within that of another one may infer that the latter is a response to the former. Advanced matching techniques may take account of indenting or other marking techniques used by email clients when composing responses that include the original. These mean the match is not identical but is predictable and can be determined in most cases by comparing the possible outcomes of a reasonable number of commonly used permutations.
  iv. Even where no similar messages are available for comparison, the message itself can be analyzed to determine with a good degree of accuracy, the sequence of responses shown within it. A relatively small number of email client applications are in widespread use and each of these has well established conventions of how they sign messages, how the original message is presented within a response etc.
  v. Ideally, some form of unique topic or thread identifier is used. This may be a trouble ticket number or inquiry number already present in the message or its subject—or it could be inserted deliberately to facilitate this mechanism. Such a token may be hidden or invisible to the human reader if its sole purpose is to link related messages. Where a company uses a particular CRM system or convention for customer account numbering, a filter that recognizes such patterns may be defined.
  vi. A weighting method or statistical techniques such as Bayesian filtering may then be used to determine the significance of the address list, the subject etc. to improve the accuracy and discrimination of clustering of messages into threads.

Figure 8:
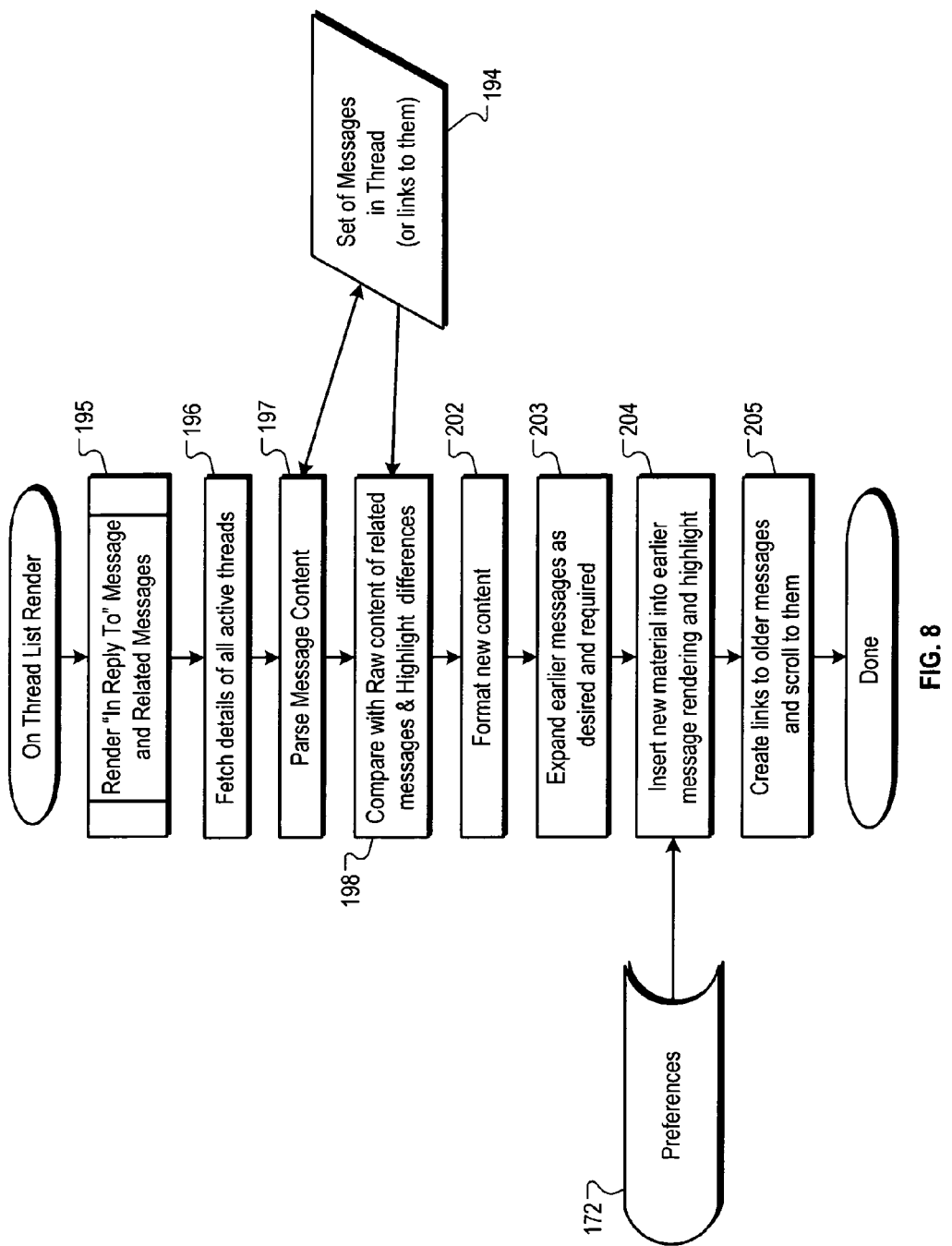
FIG. 8—Flow diagram of an exemplary method by which the presentation of FIG. 5 may be derived.

FIG. 8 is a flow diagram of an exemplary method by which the received message and any available related messages may then be parsed and processed so as to deliver the enhanced presentation of FIG. 5. The method can be implemented in a client device, such as mobile communication device or personal computer, or can optionally be implemented an application server (143) of FIG. 21, or distributively implemented between a client device and the application server (143), and is operative to generate thread display data that causes a client device to display an environment as shown in FIG. 5.

The method is called recursively on any related messages (195) that have not already been parsed by this method.

The email client used is determined (196) by reference to the MIME source of the message (199).

The body of the MIME message (200) is then parsed according to the known formatting applied by widely used email clients. In this example, each ">" at the start of a line of text indicates this came from one email further back in the chain. Lines with no ">" characters at the start are newly added as part of this message. Furthermore, in this example, where successive non-blank lines start with the same number of ">" characters, it can be inferred that there is no hard carriage return between the content of these lines. A close approximation of the original text of each message in the response sequence can be determined.

Even without the original text of the other emails, a good approximation can be made of this and any inserts into it (e.g., (201) of FIG. 6) noted. Where the original text of the other messages is available (194) a more detailed comparison can be made to identify and highlight any other changes (198).

The newly added content that is not interleaved within an earlier response is now formatted for display (202). This and the subsequent steps may include any or all of the previously discussed display optimizations.

A combination of user preferences (172) and the newly determined knowledge of which, if any of the previous responses have had material added or altered determines (203) which of the related messages are to be shown in expanded or compressed (summarized) form.

The display of those (now expanded) previous messages into which text has been inserted or modified is created (204) using knowledge of the differences between original and current message. Preferably the changes are summarised in a familiar form—such as that used in "red-lining" documents.

Linking lines, icons or other devices are created (205) to link the new message to the appropriate points within the previous messages.

Viewing Multiple Threads

Consider now the case of a user who has been offline for some time or has otherwise received multiple incoming messages that have not yet been viewed. When he next comes to view his inbox, there may be several email threads active, each of which may have had several responses. The longer the user has been offline, or the more overloaded he is, the greater the number of threads and the greater the average number of interactions on each thread. Against this, the larger the list of emails, the more likely it is that someone else has already responded—making it no longer necessary for this user to do so. It is therefore much less efficient to catch up with the latest exchanges by simply reviewing each in turn and hence "clear one's in-box" than it need be.

FIG. 9 shows a typical email client application window that allows the user to click on a column header to sort the email by one of several fields—such as received date, sender or topic. The upper section (243) shows a relatively simple set of messages with one thread roughly corresponding to the previous examples. The eleven messages resulting from this "thread" are interleaved with three single, unrelated messages. The other three messages are swamped by those from the "Sales Meeting" thread and are difficult to pick out at a glance.

Note that due to the incremental evolution of these examples and a desire to show specific enhancements rather than overwhelm the reader with all permutations, the timestamps, Return Receipts etc. are not entirely consistent with those shown in FIG. 5).

Some applications offer sorting messages "by threads". By clicking on a dummy column header (244), the messages are grouped into threads as shown in (245).

The existing columnar and simplistic threading approaches shown are not optimal, especially when catching up on a large number of unread items. Specifically, they have the following disadvantages:

i. Where message titles are not consistent, messages are not always grouped into the appropriate "thread" even though they relate to one another.

ii. Return Receipts are not grouped with the originating thread to which they refer. They actually cause so much clutter—especially when dealing with large groups of recipients—that this can be a significant deterrent to their use.

iii. Similarly, delivery failure messages are not grouped with the thread to which they refer.

iv. Said delivery failure messages are cryptic and difficult for non technical users to understand.

v. Until the first response (whether a genuine response or a read receipt, failure notification etc.) is received, there is nothing to indicate that a thread is active. The user would have to view Sent Items to remind himself of the outstanding thread(s) that he has initiated.

vi. Although the user can choose which columns are shown, many of these are sparsely populated (e.g. Attachments, Priority etc.) and showing a large number of them is not practical given a limited screen width.

vii. It is not clear who has received or read which messages—especially intermediate responses made by others in the chain.

Figure 10:
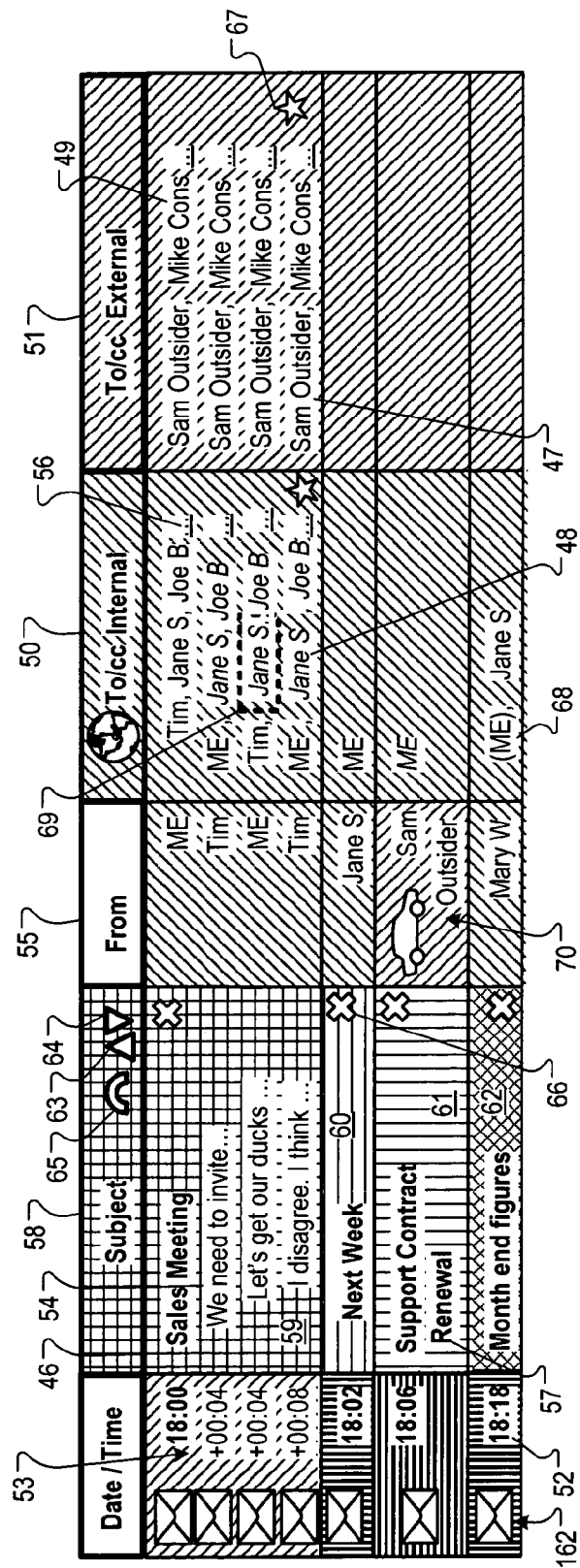
FIG. 10—Enhanced presentation of the emails of FIG. 8.

FIG. 10 shows the same set of messages presented by an example of the present invention. In the example environment of FIG. 10, a message may appear in the list even though no responses have been received for it. The list is therefore not simply providing a new view of the traditional "Inbox" but also includes some messages that would previously only show in the "Sent" and/or "Outbox" folders.

The nature of each message may be indicated (162) so as to differentiate email, Instant Messaging, telephone, video etc. This symbol may also indicate whether the interaction was a two-way or multi-way one.

The background colour, texture or other graphical attribute of the message thread's subject column (58), as indicated by the various shaded patterns, may indicate message threads that this user initiated (59); is a participant in (was sent the message as a "To" address) (60); was merely copied on (61) or was blind copied on (62).

Messages are grouped into threads (46) even though the Subject may differ—with "RE:" or "FW:" prefixes.

The priority of a message thread may be indicated by colour of text (57), such as red, green, etc., background colour an icon or other graphical device.

As in FIG. 9, whether or not a message has been read can be indicated, e.g., bold in the Subject column (58) indicates an unread message.

Within a thread, rather than needlessly repeating the known subject, only the start of the text of subsequent messages is shown (54).

The user may select a thread—and have focus within that thread directed to a specific message—by, for example, double-clicking on any line within the Subject column (58). This will typically bring up a window such as that of FIG. 5 showing this thread in more detail.

"Housekeeping" messages such as Out of Office Replies, Return Receipts, Delivery Failure notifications, etc., are not shown as separate messages. Rather, they are used to mark recipients appropriately. The marking can be done by various visual indicators, such as text formatting, text colours, or background colours. For example, in FIG. 10, an address (47)

can be coloured, e.g., orange, to indicate an Out of Office Response; address (48) can be greyed out to indicate no return receipt yet; and address (49) can be coloured red to indicate a delivery failure. Clicking on an address or hovering over it will pop up an explanation of the status along with appropriate text, e.g., content of the Out of Office Reply or the reason for non-delivery. It may also offer options to resend etc. as previously.

As in previous examples, addresses are grouped according to domain. Background colour and logos are used to identify companies and groups of companies, as indicated by the shaded patterns. However, in this view, three columns are used to highlight the sender (55), internal (50) and external recipients (51) respectively. As before, a set of mappings of domain name to company name, type, colour and logo can be used. Note that, although only shown (70) in the "From" column of FIG. 10, each individual address shown within any column may have specific formatting and/or graphic symbols associated with it.

As in previous examples, where lists of addresses have been truncated to fit the available space, selecting by hovering over, clicking or otherwise on an ellipsis control (56) will show the full list represented by it.

Blind copy (bcc) status, by its very definition, can only be known if one is a blind recipient oneself or if one is sending a message. As it is important to be aware of this status, it may warrant a more obvious differentiation than the bold/italic/colour indications previously discussed as differentiators between "To", "cc" etc. The use of parentheses (68) or some other graphical symbol or construct is recommended to highlight this status (where it can be known).

Optionally, the display of addresses (or their abbreviations) in the two "To/cc" columns may be formatted such that the order and/or spacing of the addresses is consistent—even if the list of address changes from one message to the next within a thread. This serves to highlight any changes to the list as those deliberately dropped from specific exchanges will be conspicuous by the gap appearing on a particular line where the lines above and/or below show a name. Optionally the gap itself may be highlighted, e.g., (69) (as indicated by the dashed line box) indicates that Jane S was not copied on this message. The user can therefore infer that her address was deliberately added back by Tim in his subsequent response. FIG. 10 actually shows a further refinement where the fixed order and spacing applies to all participants except those actually sending messages—whose addresses are brought to the front of the list first.

As in previous examples, date and/or timestamps can be shown as absolute (52) or relative times or as time differences (53) between successive messages within a thread. As before, adherence to service levels can be indicated by background colour or other graphical device, again as indicted by various shaded patterns.

The order of rows within the table can be altered by clicking on sort buttons at the top of each corner. FIG. 10 only shows these (63), (64) on the Subject column (58) but they may be present on any of the columns. In addition to the standard alphabetical or numerical sort provided by these buttons, additional sort orders can be achieved by clicking on the "rainbow" icon (65). This sorts the table according to the other attributes shown in that column—typically the background colour followed by one or more secondary/tertiary sort(s) on appropriate field(s). For example, in the Subject column, this would sort by background colour (this user's participation in the thread—sender; recipient; blind copied; copied to) followed by text colour (priority), followed by subject. In the date/time column, this would sort by colour (adherence to required response—red/green/amber/grey). Repeated clicking on the rainbow icon (65) may result in a simple reversal of the primary sort field order or may invoke the next of a cyclic list of many possible sort orders (since there is no one definitive way to order colours). For example, where there are only four possible colours (or four other visual indicators), four successive clicks of this control may sort each of the four colours to the top of the list in turn.

For each message thread shown, there is a control (66) that the user can click to remove the thread from the active list. This does not delete the message(s) associated with the thread. Instead, it simply removes them from this task oriented view of active threads.

Note that in FIG. 9 is that every incoming message—even if it just an Out of Office Reply or Read Receipt—is presented as a new incoming message and hence invites the user to check and acknowledge it. The display of FIG. 10 deliberately avoids this but in some cases it is important to be made aware of changes to the status of the thread due to such responses. Accordingly, a graphical device, such as a star (67) may be used to indicate a change in the status of a recipient e.g. has received, will not receive, etc. By hovering the cursor over said star, the user is informed (e.g. via a pop-up or alt-tag) what the star is highlighting (e.g. "Out of Office Reply received from Sam Outsider: 'Sorry I'm out till Monday.'"). Clicking on said change indicators acknowledges the alert and removes it. In one variant a single change indicator (67) may accumulate changes for the whole column within which it is displayed—allowing review and acknowledgement of all that relate to that column at once. In a further variant, said change indicator (67) may relate to the entire row or even an entire thread.

To facilitate the display of FIG. 10, a number of changes are preferably made to the window or form within which one composes a message. For example, the "Send" button can be replaced by two buttons or controls:
  i. "Fire and Forget"—sends a message as at present. Does not subsequently show it in the list of messages unless someone subsequently responds to it. Does not request read receipts.
  ii. "Send and Track"—sends a message as at present but also requests read receipts and immediately makes the sent message appear in the list view of FIG. 10—even if no-one has yet responded to it.

An optional control or group of controls can be presented. These allow the user to specify a timeframe within which a response is expected. Typically this will include a small number of preset options (e.g. 1 hour, 24 hours, 72 hours) but may also allow for a specific duration, e.g., days, hours or a specific date/time deadline to be entered. This expected response period can be used to drive the colour coding and other actions associated with the date/time fields of FIGS. 2, 5 and 10.

A checkbox labelled "Done when all have read" or words to that effect, can be implemented. Typically the default setting for this option is for it to be unchecked. If checked, the application will automatically remove the thread from the list of FIG. 10 as soon as read receipts have been received from all recipients.

One or more checkboxes from a set that determine whether or not the user wants to be positively advised (e.g. via a change indicator (67)) when messages such as Out of Office Replies, Delivery Failures, Read Receipts etc. are received. The alternative being that the display simply shows the current status and the user looks to see if, for example, everyone received the message. If using the response timer (b) above, then any message that was not received by all intended recipients after the due time will be highlighted as a whole—and the specific out of adherence parties also highlighted—inviting the user's attention.

Where addresses are shown (e.g. as part of a "reply" or "reply all" command) these are traditionally either preceded by a drop-down combo box allowing the user to choose "To", "cc" etc. or are grouped into a list within separate text entry areas for "To", "cc" etc. This makes it cumbersome to simply switch between "To" and "cc" or vice versa. The other options ("bcc" etc are far less frequently used. It is therefore advantageous to show a control that allows single-click changes between the most common options. A further control may be provided to allow the other options to be selected.

Within the grid of cells, the user may select one or more individual messages and/or complete threads. In combination with right-click menus, menu items, toolbar buttons, drag and drop or other control mechanisms this allows the user to:

i. Delete or move a set of messages with a single instruction—rather than having to act on each one.
ii. "Merge" one or more threads with previously read messages and/or other "threads" that relate to the same topic—even though the automated system did not consider them to be from the same thread. A simple drag and drop mechanism may be used for example. By dragging one thread onto another and "dropping" it, the two may be merged and redisplayed as a single thread.
iii. "Split" a thread into two or more separate threads—for example where the user recognizes that the automated clustering has grouped two sets of messages together that are not really part of the same topic.

Figure 11:
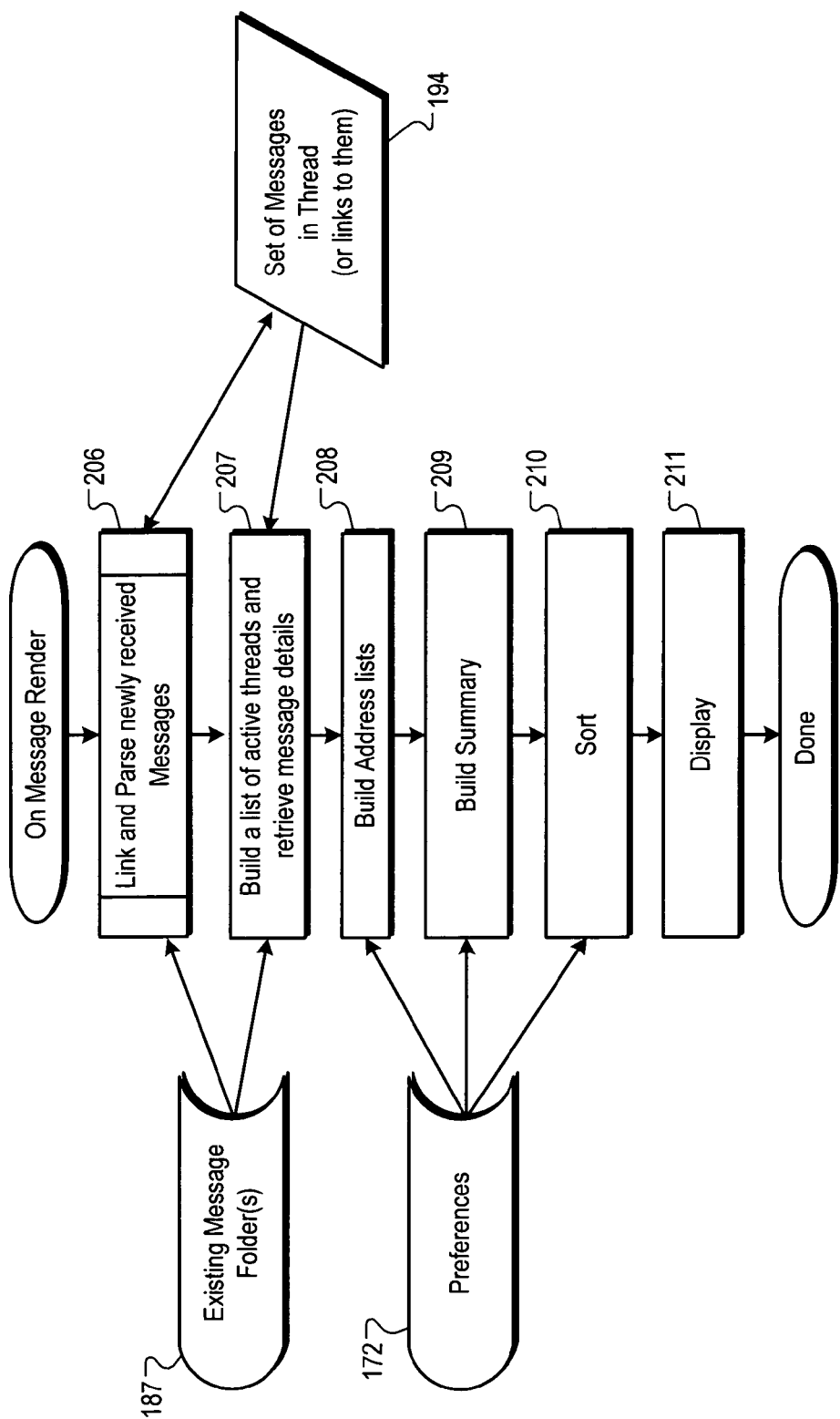
FIG. 11—Flow diagram of an exemplary method by which the presentation of FIG. 10 may be derived.

FIG. 11 is a flow diagram of an exemplary method by which the presentation of FIG. 10 may be derived. The method can be implemented in a client device, such as mobile communication device or personal computer, or can optionally be implemented an application server (143) of FIG. 21, or distributively implemented between a client device and the application server (143), and is operative to generate thread display data that causes a client device to display an environment as shown in FIG. 10.

Any newly received messages are processed (206) according to the algorithms already described.

Details of the threads to be displayed (by default only those marked "active") are retrieved (207) from the local data store (194) and the content of the messages involved is retrieved where necessary from existing message folder(s) (187).

The set of parties who are contributing to each thread is determined (208) so that the fixed ordering option can be used—leaving gaps where parties are not included on a specific message.

The other summary information—subject, first line of content and timestamp is constructed (209) for each constituent message. The timestamp preferably uses shortened, relative timestamps thus avoiding redundant information being displayed—such as the year and month of receipt when this is the same for all messages; removing the date portion altogether where this represents "today". Alternatively use relative time labelling e.g. +1 hour, +7 days etc.

The entries are then sorted (210) according to the current or preferred sort order. Grouping and ordering of threads and the messages within them is not only performed according to time of receipt, sender, priority etc. as existing email clients do but also according to other factors which are likely to influence the order in which the user should review the messages. For example, whether or not this user was sent the message directly ("To") or merely copied it ("cc"); or blind copied ("bcc") whether or not anyone else has already responded to it.

The sorted items are then displayed (211) in the grid.

FIG. 12 shows an alternative display. Instead of presenting each "thread" and acting on but effectively removing the Out of Office Replies, etc., the user may be presented with a list of messages that is very similar to that of FIG. 9. Features to note where this display differs from that of FIG. 10 include:

i. The relationships between messages may be shown to the user by means of highlighting, joining with lines or other graphical indicator (212) that alerts the user to the fact that several of the items are related. FIG. 12 shows an example of how this linkage would appear when the user selects or hovers his cursor over any line in the "Sales Meeting" thread e.g. (73).
ii. Cryptic standard subject headings e.g. "Return Receipt (displayed)—Re: Sales Meeting" are translated into a more user friendly "Sales Meeting: VIEWED". Likewise for Out of Office Replies and Delivery Failure Notifications.
iii. The replacement subject lines are deliberately designed so as to preserve the original subject heading—making the screen much clearer when sorted on Subject column (71).
iv. Messages within a thread are automatically numbered once more than one has been sent. This number is included within the Subject line (75).
v. Where space exists after the Subject, the start of the content may be displayed (72).
vi. Whether or not the original message sent by this user to start a thread appears in the list is selectable by user preference. In FIG. 12 the user has elected not to show it.
vii. The user may select a thread—and have focus within that thread directed to a specific message—by, for example, double-clicking on any line within the Subject column (71). This will typically bring up a window such as that of FIG. 5 showing this thread in more detail.
viii. For supervisory messages, the "From" column is, by default, not used.
ix. For supervisory messages, the To/cc columns are, by default, filled in with the address(es) specifically affected by that message. The user may still click on the ellipsis link (73), (74) to see the full internal or external address list, e.g., to check if a suitable alternative recipient has already been included or not.
x. Read Receipts from a recipient who has subsequently responded are largely superfluous and hence optionally, can be suppressed. Note that the 18:03 Read Receipt from Tim Headman on FIG. 9 is not shown in FIG. 12. It is only if the time of receipt is important that a user would choose to show such messages. If the user occasionally needs to see when someone received a message—as distinct from the time of their reply—they can do so by hovering over or selecting their address in one of the "To/cc" columns at which point details including time of receipt would be shown.
xi. Optionally, where read receipts have been received for multiple messages within a thread, these can be merged into a single entry showing the individual message numbers and/or ranges to which they refer (76).
xii. The user may acknowledge a message by clicking on the appropriate control (77) on that line. The message will then be removed from this view. Optionally, to avoid frequent refreshes and unnecessary network and server traffic, the system may simply note such selections and apply all of them at a later point e.g. when the user clicks a further control, such as (78) or automatically when the screen is next refreshed for other reasons.

Many of the details and features described on FIG. 10 may also be applied to the presentation style shown in FIG. 12 and that hybrid approaches involving elements from each can be derived.

Preferably the method by which the presentation of FIG. 10 or 12 is achieved entails processing each message as it arrives and updating a set of thread details that are therefore continually kept up to date—thus minimizing any delay that would otherwise be incurred when the user asks to view the set of messages.

A system supporting multiple users may benefit from server-side and/or pre-emptive processing and caching of the thread model since the view presented to multiple users will be similar in many respects. This also allows the addition of features not normally possible in a standard email system. For example, such a system may know exactly who has read and responded to each email in a thread in more detail than can be obtained simply from standard email read receipts. The length of time each individual has spent viewing or composing a reply may also be of interest to others viewing the thread.

Splitting and Merging Threads

Now consider the more complex case of multiple independent responses to an original message. There is no longer a single "master" message being built that contains all of the previous responses. Instead one will have two or more messages that may at first sight look similar but differ somewhere in the bodies—perhaps several pages down. It is much harder now to keep track of everything that has been said on the topic.

Figure 13:
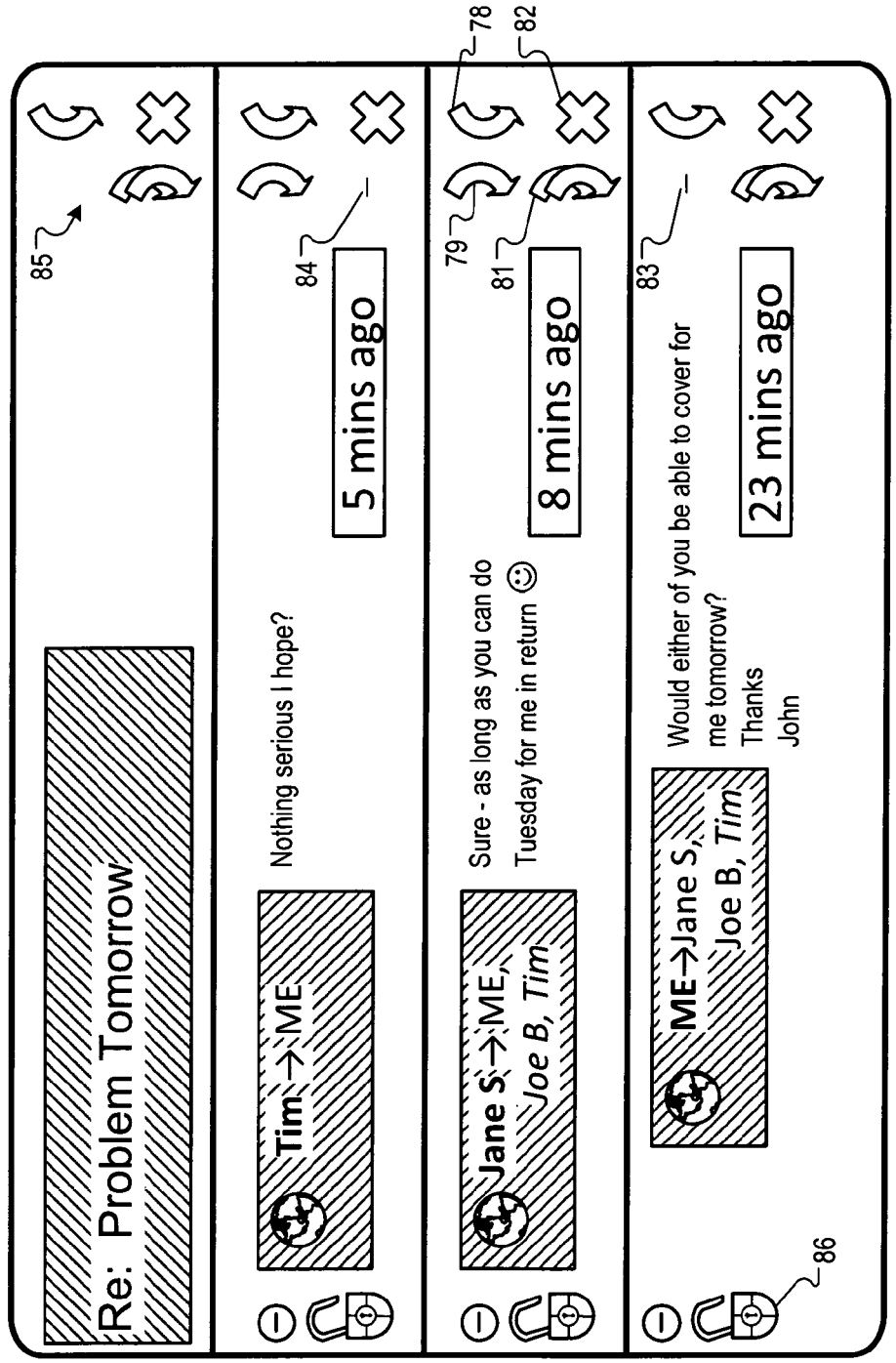
FIG. 13—Exemplary presentation of a split thread.

FIG. 13 shows the presentation of an email thread that has first split into two branches or sub-threads as two of the original recipients respond independently. One of these responses is further differentiated in that was only sent to a subset of the original participants.

The example shown here is deliberately kept as simple as possible with respect to the other features that have already been discussed. For example, Read Receipts are not used; only internal, abbreviated addresses are shown whereas combinations of internal and external domain addresses are present in the general case; colour coding is used. These features can, of course, be combined with the previous features in the overall system.

This scenario, in chronological order, is as follows:
i. John Doe sends the initial message to Jane Smith and Joe Brown (his co-workers) and copies his line manager, Tim Headman.
ii. Jane clicks "Reply All" and responds.
iii. Tim clicks "Reply" and responds—to John only.

FIG. 13 shows how the above scenario appears to John Doe as he logs in to find the two independent responses waiting for him.

The two unread responses are both expanded automatically even if the user's preference is only for the one most recent message to be expanded. Both responses are indented from the left to the same extent—indicating that they are peers rather than nested responses.

A "Privacy" control (86) may also be shown alongside each constituent message. Unlike those shown at the right, this is a toggle control that switches between two states (e.g. shows open padlock as in FIG. 13 or closed padlock once clicked). Clicking this control toggles the state of this constituent message between "Private" and "Public". User and/or system preference may determine the default privacy state for a received message. A message received with a "Confidential" indication within it will automatically be marked as private. This setting determines whether or not the constituent message is included in any responses made to the thread as a whole (see below).

As there is room to fit all of the addresses within the address boxes shown, there is no need to display the " . . . " link as could have been done for addresses that are the same as the preceding (lower) message. (Tim is cc'ed on both this and the one below).

Next to each message are one or more controls (79), (80), (81), (82). The user can click on the appropriate control to Reply to the sender of this message (79); Reply to all addresses that are listed in this message (80); forward the individual message to one or more addresses (81) or remove the message from accumulating thread content (82).

Optionally, the aforementioned controls are selectively disabled (e.g. greyed out or removed as in FIG. 13) where they are not applicable. For example, on messages one sent (83), there is no "reply" control; on messages with a single recipient (84) there is no "reply all" control. This customisation of the control set to suit the message it is shown alongside helps the user to appreciate that these controls relate to the specific message rather than to the accumulated thread content. Using these controls the user can participate in either of the two branches that have started with Jane's and Tim's responses as follows:

i. Reply to the sender of this message only. (Not offered for messages sent by ones-self).
ii. Reply to the sender of this message, copying all those who also received it. (Not offered for messages where the user was the sole recipient). Where a message has been marked "Private" a confirmation dialog will be shown to the user before proceeding with such a response.
iii. Forward this message to one or more addresses to be entered manually. Where a message has been marked "Private" a confirmation dialog will be shown to the user before proceeding with such a response.
iv. Remove this message from the thread. Does not delete it, simply hides it from view. Returning to a traditional view of the "Inbox" or other containing folder would still show it.

A similar set of controls is shown at top right (85). These perform the same functions but for the thread as a whole. The user can therefore use these controls to:

i. Reply to the sole other participant in a thread (not offered in threads with multiple addresses shown).
ii. Reply to all. This is used to bring all participants in the thread up to date with the discussion as not all will necessarily have received all of the messages in the thread. A message will be composed that contains all of the constituent messages in the thread apart from those that have been removed from the thread (e.g. via control (82)) or made "Private" via control (86). This message is addressed to the same "To", "cc" and "bcc" lists as were used on the original message that started the thread. Any additional participants that have been added subsequently are then added to the "cc" list by default. The user has the opportunity to review and manually alter the address lists and/or message content before sending the message.
iii. Forward. This is used to bring a new party up to date with the exchanges. The message content is built as for "Reply to all" above but the address list is left blank for the user to populate manually.
iv. Remove this thread. This is used when the user determines that the thread is no longer "active" and need not be viewed by him any further. As with the removal of constituent messages, this action does not, by default, delete the thread but merely marks it as inactive. A separate view may be provided to list or browse through inactive threads and mark them "active" again.

In more complex threads than that shown in FIG. 13, the user may be given the option of ordering messages down the page according to thread/sub-thread (a "nested" view) or chronologically—in which case links between constituent messages in a thread may be shown using connecting lines similar to (36) of FIG. 5 or dynamically appearing linkages and/or highlighting, such as the linkage indicator (212) of FIG. 12.

In some implementations, the messages generated by using the thread level controls (85) above may be individually tailored for each recipient. Rather than sending the same composite message—that contains all constituent messages (bar those marked "Private")—participants in the thread will, by definition already have been sent at least some of the content of the constituent messages. Knowing how each constituent message was sent to, the application can remove much of the therefore redundant information. If the recipient is also a user of this application, then the view they will subsequently see of the thread as a whole will be performing the same removal of redundant information—hence there is no loss in value yet transmission costs and time are reduced. If, on the other hand, the recipient is not a user of the application, they will not have access to the display capabilities and would appreciate the whole thread being visible within a single message. Optionally the application may enhance the content of the message (e.g. using HTML and/or scripting) to show the user a view that has some of the benefits that a user of the application sees. For example, placing each constituent message within a collapsible and scrollable frame. Preferably, the application includes a reference to said application—thus encouraging anyone receiving such a message to consider using said application themselves.

An additional benefit of using the thread level controls (85) is that the diverging branches can be brought back together again—as everyone is sent a common message (which may not include all constituent messages—some having been marked private) but is now the "common" view of more participants.

All or any subset of the same or functionally equivalent controls, linkages and graphical devices can be added to the more compressed list view of FIG. 10.

In the line per message view of FIG. 12, messages may be identified as belonging to specific branches using decimal, mixed alphanumeric or other conventions (e.g. 2-1 would be the first response to message 2 where 2-2 is a second response to the same message.)

The invention detects such splits and merges primarily by changes to the address lists on the messages. The exclusion of one or more participants or the re-inclusion or one or more is an indicator of such a "split" or "merge" respectively.

Where the participant list changes, the system of the invention may choose to display the list of remaining participants and/or the list of those no longer participating. For example in an exchange between 20 individuals, if a branch appears with the 18 internal participants but not the two customers this may be more informatively and succinctly highlighted as "excluding" the latter.

Alternative methods can be adopted where this is a common requirement. For example, a change to the subject (typically adding a suffix) can be used to force a deliberate split even if the set of participants is unchanged. This is particularly effective for the user of the application who can indicate his intent to the application while responding.

Preferably, many of the formatting features described above can be incorporated within the html form of the body of any response being sent by the user of the invention. In this way, those using traditional email clients become aware of some of the power of the invention.

Facilitating Use of Most Appropriate Medium

The foregoing features of the invention address the presentation of messages as threads of interaction—but only within a "store and forward" messaging system. By presenting the stored messages more effectively, the user is better placed to assimilate the information and be able to respond. However, there is a great temptation to respond through the same medium. Even if some messages have audio or video attachments, the application typically feels like an email system and encourages response via email.

The term "Unified Communications" elates to the infrastructure and devices used in communicating over a variety of mechanisms. However, the available client applications or end-user tools for interacting with these rarely, if ever, spans both real-time ("synchronous") and messaging ("asynchronous") communications. There are links between them, such as Voice-Mail but each still has its own user interface. This makes it more difficult for users to jump between these two modes than it need be.

For example, as soon as more than one other party is involved in an email exchange, there is a reluctance to simply "pick up the phone" and call the sender—because the other party will not then have the benefit of hearing your response. Because they do not see an email coming back they may assume that you have not dealt with the issue and chase you. So rather than resolving it—as you know you could since the sender is showing "online" and is contactable via voice. The easiest thing to do, since one is interacting with an email application is to send an email to both parties. This can be costly—not just because the issue is not resolved to the benefit of the sender until they next pick up their email but in the meantime, there is a chance the other recipient calls them—duplicating or even contradicting your response.

Figure 14:
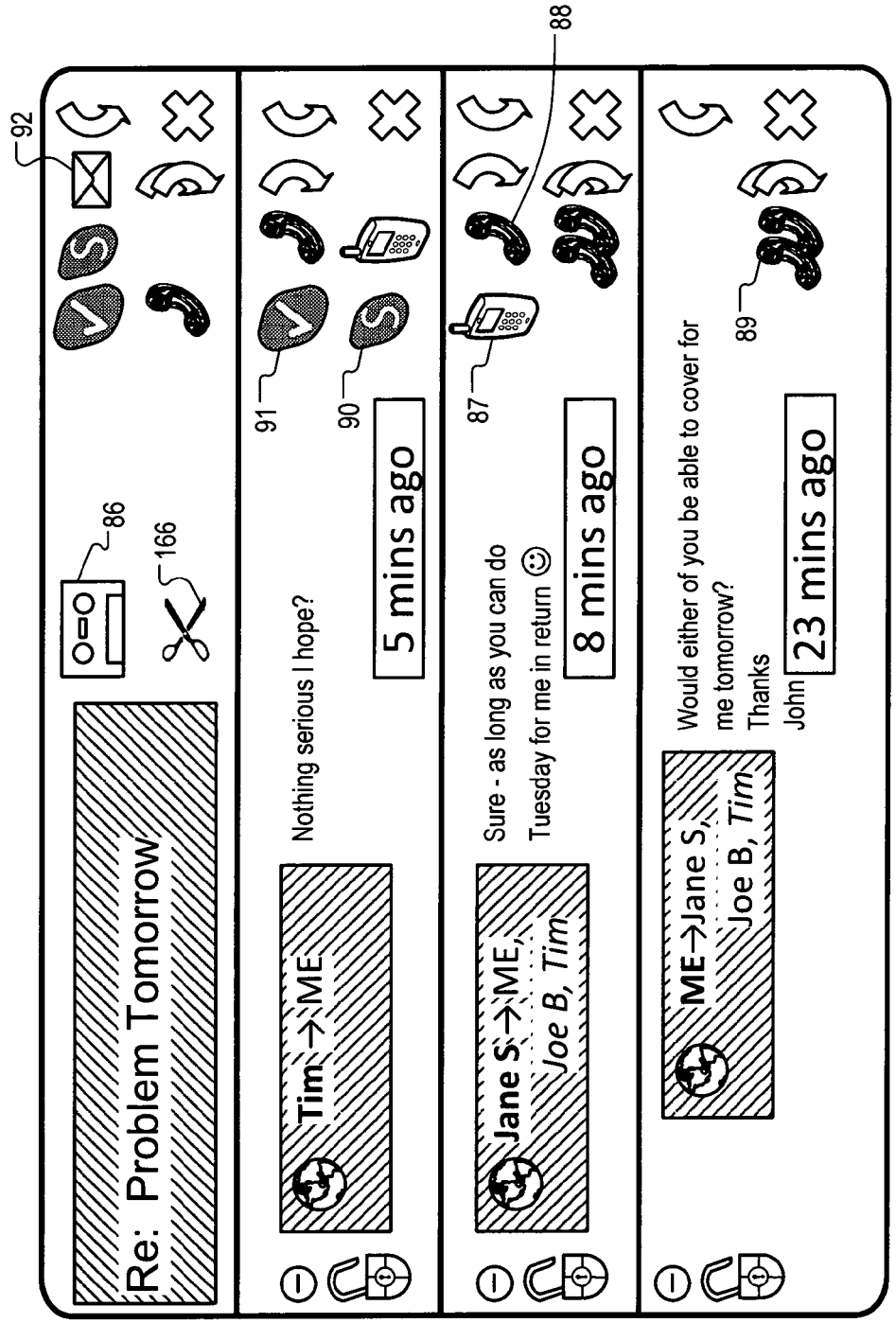
FIG. 14—Presentation of thread designed to encourage use of other media.

FIG. 14 shows a presentation designed to encourage the use of the most appropriate medium. The identities of the participants shown in any message trail or "wrapper" described above are preferably shown as hot links These show either directly, through one or more graphical devices and/or through pop-up information when selected some or all of the mechanisms by which that individual can be contacted, the current availability of the individual on any or all of these ("presence"), and the individual's preferred communications method.

Alternatively, some or all of the above may be shown on the display by default. For example, in FIG. 14, the means of contacting the individual(s) involved in the individual message are shown (e.g., icons for cell phone (87), "landline" (88), telephone conference (89), Instant Messaging (90), Audio via VoIP (91) etc.). The means shown are appropriate to the number of individuals (e.g. telephone conference is only shown where more than one other participant is involved (89).

The order in which icons are shown may be influenced by personal and/or corporate preferences. These may take into account cost/benefit issues e.g. speed of interaction versus cost of interaction may dictate that web chat is preferred as it is negligible cost and rapid. Cellular call being more expensive might be less preferred. "Personal" preferences in this case may include not only the user of the application but also the recipients (e.g. who may have indicated that they are abroad and hence incurring expensive roaming charges on their cell-phone.) Where the other recipients are also users of this application, such preferences may be hidden within the text and/or headers of the message previously sent.

Services that show presence, such as instant messaging may incorporate this into the icon or other indication used e.g. (91) may show "Online", "Away" etc. Most such services use their own set of icons to show these states and, as users will be familiar with these, the same or similar indications can be used to good effect here.

Note that many users subscribe to multiple Instant Messaging services. The system may show each individually or combine presence information from several to show the most likely method of reaching that individual. For example, a party that uses Skype® and AOL Instant Messenger® may only be online on one of the two—so that one would be shown in preference.

Where a message exchange involves multiple parties, not all may be reachable by all means. In such cases the application may rank icons according to the "coverage" (number of participants that can be reached—optionally giving priority to "To" over "cc" participants). Those methods providing partial coverage may be greyed out and/or provide indication (within the icon, on pop-up text or menu for example) to show how many and/or exactly which participants can be reached via those mechanisms.

When the user clicks on or otherwise activates one of these controls, a call is made or message prepared (as appropriate) for the parties shown in that message exchange. The user can subsequently deselect these and/or add other parties but the default participant list is as per the message exchange next to which the icon is shown.

A similar set of icons is shown at the top of the window and relate to the thread as a whole—hence potentially all participants in the thread shown. Note icon (92) which allows creation of a new, blank email message as distinct from the Reply All icon below it which, as previously discussed, will automatically construct a comprehensive record of the interactions to date and use this as the starting point for an email to all participants. As above, these communication means may not be able to reach all parties and hence may show partial coverage information. Unlike the icons on individual message sections below, clicking on one of these icons will initiate interaction with the full list of participants in the thread (again, by default with the user then able to add and/or remove participants).

Contact with an individual or group may therefore be attempted via any of the mechanisms shown—for example by clicking on a telephone icon next to that user's name. Alternatively, where not all options are shown already, clicking on a name may bring up all possible communication methods allowing the user to select one of many, preferably ranked according to the user and/or recipient's preferences. Note that the set of communication methods is not exhaustive and is intended to allow the addition of others as required. For example, a video call as discussed later.

At an intermediate level, since participants are already grouped by domain (typically corresponding to all those from a particular company) a further command can instruct the system to attempt to connect to all of those. For example, when showing the user the list of addresses with whom communication is to be initiated, if these are grouped by domain and an additional control such as a checkbox embedded in a surrounding frame may allow the selection or de-selection of all addresses within that domain.

In some implementations, even when the user opts to communicate with one or more parties via a real-time mechanism, such as by telephone or by instant messaging, that interaction is automatically recorded—for example as an audio file, a text record or a recording of the user's desktop—and can be made available to the other parties involved in the interaction. In an alternative implementation the user may be prompted to decide whether or not the interaction should be recorded and/or may start, stop or pause recording at any time.

FIG. 14 shows an icon (86) that indicates whether contacts (by whatever mechanism) will be recorded (if possible) or not. The user may click to toggle the state of this prior to and/or during a contact. A further control (166) may be provided to allow the user to "break" the recording of a real-time interaction. This will split the recording at the point the control is used—with a recording prior to it and a new one after it. This allows the user to make many, focused and relevant recordings within one interaction which may cover several topics, not all of which need to be recorded or which need to be forwarded to different people.

If the user of the invention places a telephone call but the recipient is not available or chooses not to answer the call, the call may be diverted to a voicemail system. However, some phones are not provided with voicemail; some users choose not to turn it on and even with those that do, leaving a message on the recipient's voicemail system will result in the message being left for only that one recipient. Hence, whether the call diverts to voicemail or not, the user of the invention may choose—for example, by clicking on a button on the user interface of the application—to record a message using the invention rather than leave a message on the recipient's voicemail. Should they choose this option, the telephone call may be terminated and their speech is recorded from their headset/ handset/microphone. Optionally they may choose to leave a voicemail and have a local recording made of them doing so.

The user may indicate that they have completed recording their message—for example, by clicking on another control on the application's user interface or in the case of leaving a voicemail whilst recording a local copy, by hanging up the telephone connection. One such control will preferably attach the file containing the voice recording (or a link to it if it can be accessed remotely) to an email ready to be sent to the person that the abortive telephone call was placed to. The other participants in the thread may then be copied the recording and can choose to listen to it at their convenience.

Figure 15:
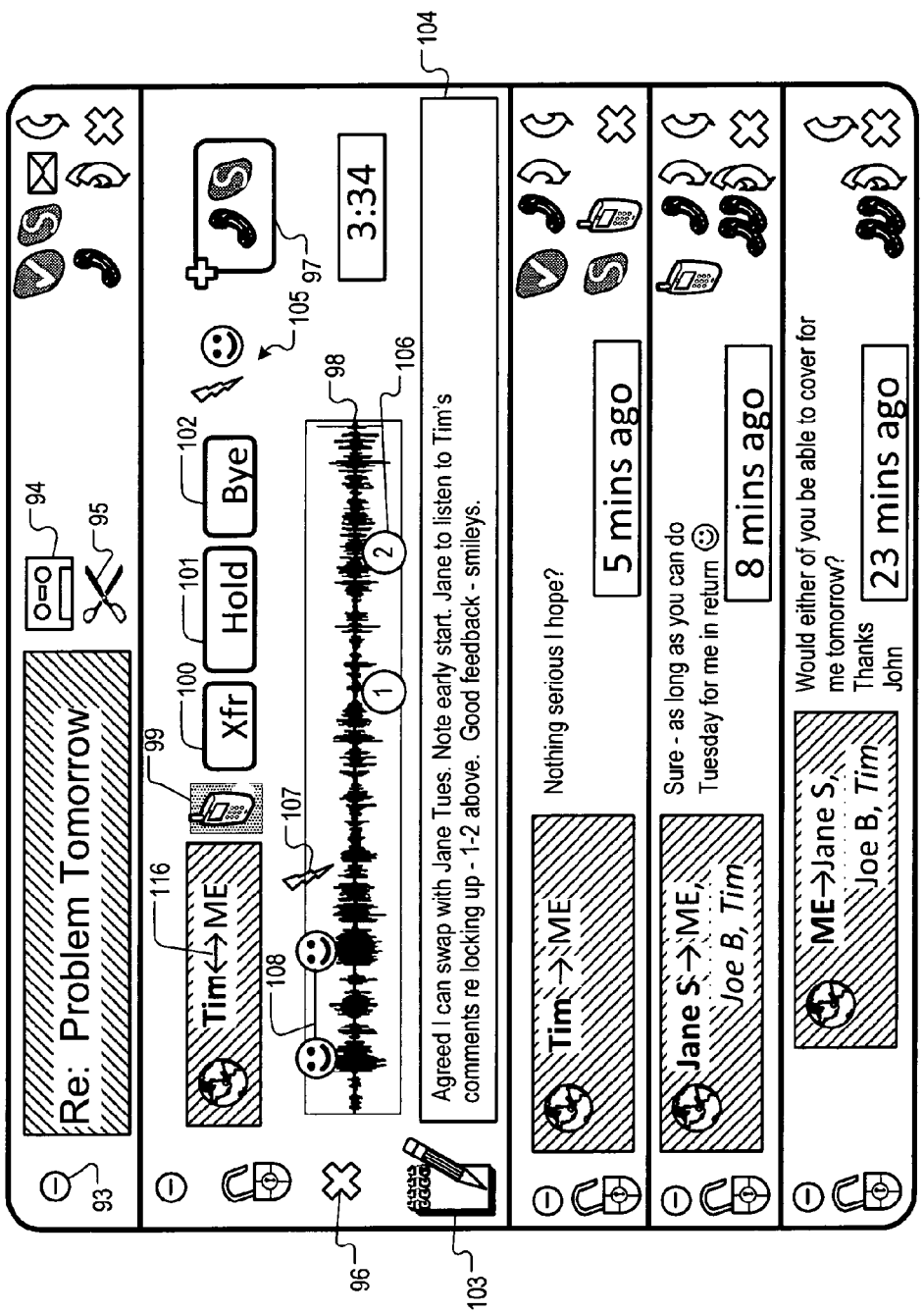
FIG. 15—Presentation and annotation of an active telephone call.

Preferably, the progress of any recording—whether a live telephone call, multi-way conference call or leaving a message—is shown graphically as it is recorded—for example as an audio waveform. FIG. 15 shows the user interface during a telephone call that has been initiated as part of an ongoing thread which already contains three email messages.

It is common practice for an audio file to be shown in this manner (98) but in a preferred embodiment of the invention, the horizontal axis represents time at a fixed scale. This scale can be set according to user preferences but is preferably set so as to allow the user to see the gaps between sentences as sufficiently wide areas in which to click with accuracy—so as to start playing from the start of the following utterance.

As a recording progresses, the audio waveform extends to the right within the area allocated to it. Should the duration exceed that which can be shown within the horizontal area available, it may (according to user/system preference) "wrap" to a new horizontal line below the first one. This makes audio appear more like text. The user can see at a glance how long it is and can see long pauses. It also facilitates annotation of the recording with the full or partial textual transcript should large vocabulary speech recognizer (LVSR) or keyword spotting (respectively) have been performed on it. In FIG. 15 manual annotation is shown (104) and is indicated as such by icon (103).

Optionally, a long pause (defined, for example, as a period of time greater than a pre-set threshold within which the instantaneous, cumulative or time-averaged audio amplitude or energy does not exceed a threshold) will cause the audio display to wrap to another line—providing some visual feedback similar to that achieved by paragraph breaks in text.

During the recording, the user may annotate the recording with actions such as clicks, text entries (104) or selecting from a number of pre-defined options (105). This may be a deliberate action on the part of the user—clicking on an icon within the application (105). Alternatively, such annotations may be the result of integration with other applications. For example, on bringing up a customer credit application form on screen, the audio recording may be marked to that effect. This can be achieved by integration with the application responsible for displaying said form or by "screen-scrape" techniques whereby the presence of a pre-defined text string or graphical pattern on screen can be used to infer the presence of said form.

Initially such markers or typed entries will be automatically time-stamped and hence can be related to that instant of the communication. However, in a preferred embodiment, the user may adjust the timestamp—for example by dragging the on-screen marker (107) along the time-axis or by stretching a marker (108) (e.g. via drag and drop) so as to cover a period of time rather than a point in time. Certain markers (such as the "Smiley" in FIG. 15) may be automatically defined as covering a period rather than a point in time. Such controls may show as two-state buttons—appearing depressed or activated when clicked the first time and returning to their original state on a subsequent click. When activated a line (108) may be seen moving with the newly recorded audio until the control is clicked again. Multiple such lines may be active at the same time within a call.

In addition to the predefined markers (105) the user may simply click within the audio waveform. Preferably this results in numbered markers (106) which the user can subsequently delete, move via drag-and-drop, add comments to, etc.

These markers will be stored or otherwise associated with the recording and can subsequently be used to select, edit and/or highlight sections of the recording. These sections can then be attached to email messages allowing the user of the invention to pass on selected, relevant sections of the recording as an alternative to the entire recording. This allows the user to remove extraneous or irrelevant content and hence make the review process more efficient for those to whom the attachment is sent.

With respect to the example of FIG. 15 in particular, while the call is in progress, the application provides shortcuts to appropriate features e.g. for a telephony call as shown here, Transfer (100), Hold (101) and Release (102) functions are immediately available. More advanced features such as those available on softphone implementations may also be provided.

To add other parties into the call, the user may click on icons (97) that show appropriate mechanisms by which others can join this interaction. In this case, a phone call may be conferenced with a Skype® audio call and/or other telephone calls.

The user may choose, during or after the call, to delete the audio recording—leaving just the text annotations (if any) and the basic information about the call (participants, time, duration etc.). This can be done using control (96), which allows the user to compress the entire display for previous messages in this thread to a summary form.

An indication (116) indicates that the interaction was two way. This will be shown on subsequently viewing this thread as well as during the call.

Another indication (99) of the method used is shown and, from its background colour in this case, as indicated by fill pattern surrounding the phone, indicates the fact that the interaction is still active. Said indication may be included in subsequently forwarded messages so that other participants in the thread are aware of this information.

Recording control (94) is effectively tri-state. Here it is showing not only that recording is enabled (as it did in FIG. 14) but that it is actually recording now. Clicking this control at the point shown in this Figure would stop recording without hanging up the call.

On receipt of an attachment that is identifiable as an audio and/or video recording, the system incorporating invention will display this in a similar fashion—giving the user an instant appreciation of the duration of the call and an ability to start playing it from anywhere within the recording. This is more efficient than having to recognise the type of attachment, select and open it and then have a separate media player obscure the body of the email.

In some implementations, the recording is made with separate channels or "tracks" for the user's voice and the other parties on the call (a "stereo" recording). In further implementations, the recording is made with separate channels or "tracks" for each participant in a multi-way call.

By recording the audio in separate tracks it is easier for analysis tools such as a large vocabulary speech recognizer (LVSR) or a keyword spotter to interpret the audio and produce a whole or partial transcript of the recording. Preferably the transcript may be shown alongside the recording. This may be used by the user making the recording to select portions of the recording for onward transmission to other parties. It may also be sent with the audio recording to help the recipients to identify the sections of interest to them—by identifying text and the time offset at which it occurs—as an alternative to having to listen to the entire audio recording.

The display of the audio may be further enhanced in cases where different participants can be identified. For example, the audio waveform display may wrap to a new horizontal line on the display whenever the active speaker changes. This can be determined, for example, by determining which of the tracks contains the most audio energy within a sliding time window. Alternatively, many large vocabulary speech recognition tools first determine the identity of the speaker and a change in this can be used to move to the next "line".

Similar "line-wraps" may occur when text is entered (e.g. with carriage return or enter key as used in instant messaging to complete and send a message). The system will preferably break the horizontal run of audio recording, insert a line onto which the text is typed and continue the current audio beneath that point. The user can then continue to type into the text area associated with the time they started this annotation or click ahead of the growing audio waveform to move their next annotation point back to current time.

Figure 16:
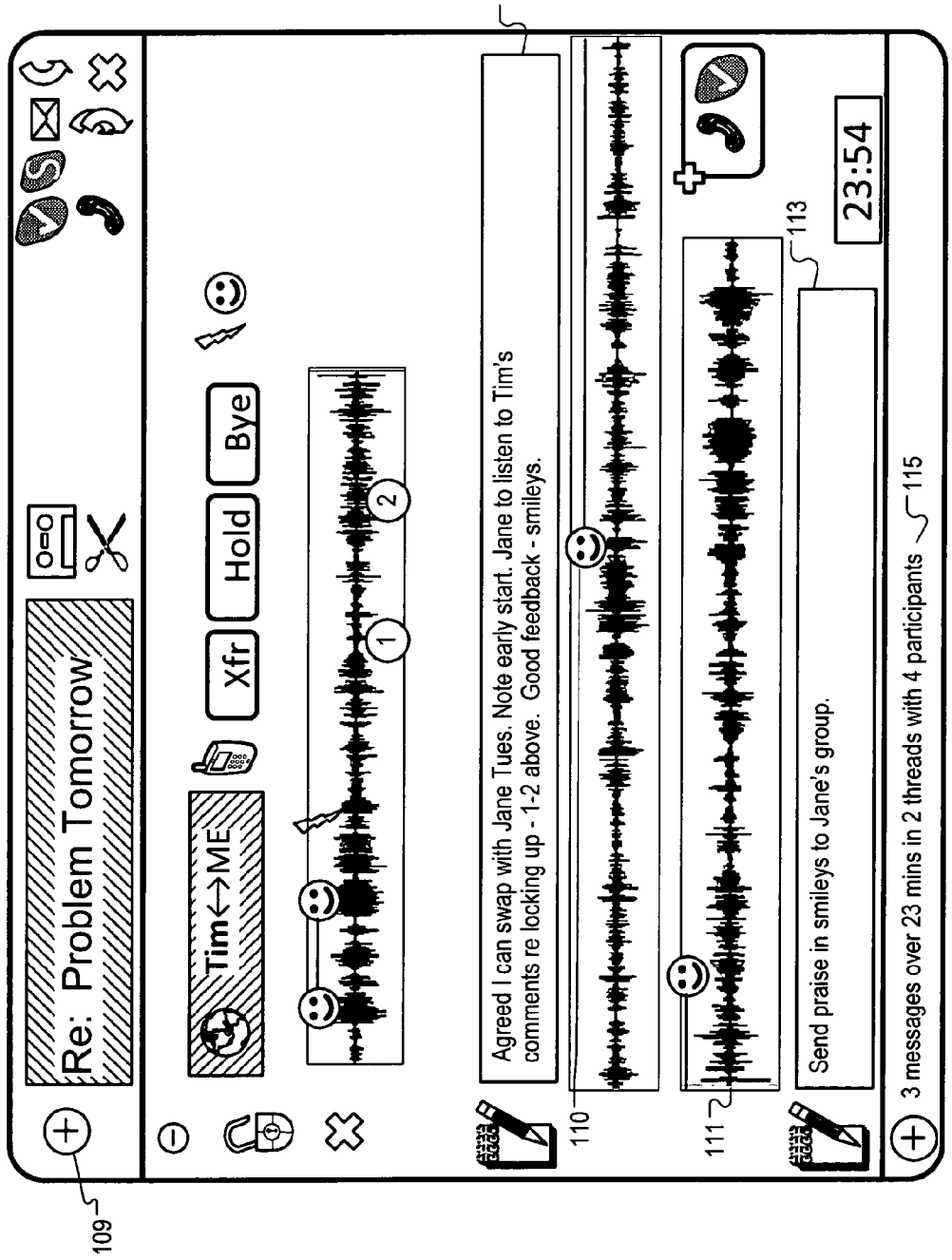
FIG. 16—Presentation and annotation of lengthy telephone call.

FIG. 16 shows a telephone call that has progressed for a longer period. Notes were entered at the start but during the time period shown by the second line of audio (114) no additional notes were made. Hence the next wrap (111) was to immediately below (114). Further notes have then been made (113). Note how the period covered by the "smiley" icons (110) extends over two tracks.

Also note on FIG. 16 that control (93) of FIG. 15 has been activated so the previous messages show as a single line summary. Selection of control (109) would expand these again if needed.

The scissors control (95) on FIG. 16 allows the user to manually split the recording of an active call. Had the user done so during the latter half of the phone call shown in FIG. 16, a display such as that of FIG. 17 would be shown.

Figure 17:
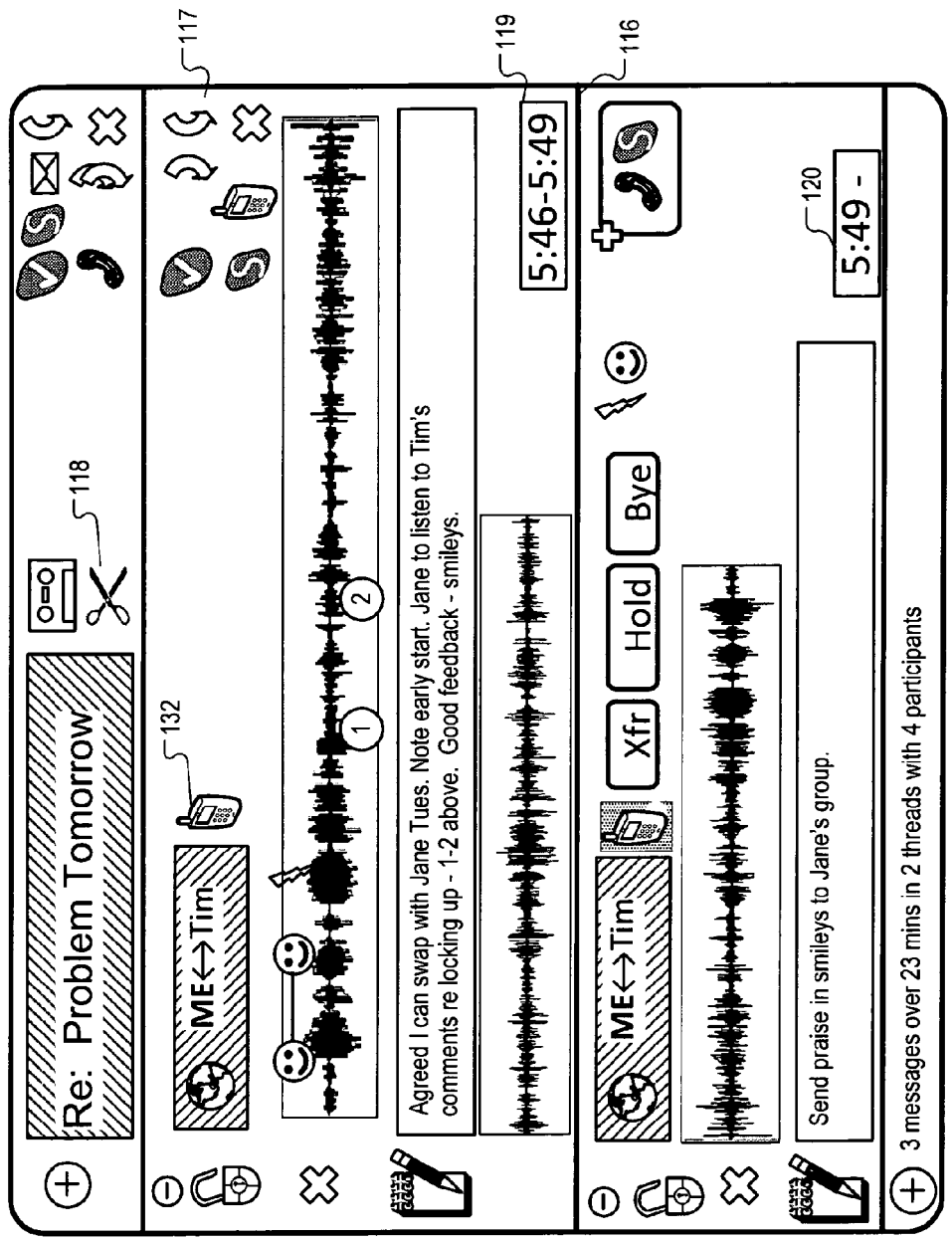
FIG. 17—Presentation and annotation of "chopped" telephone call.

In FIG. 17, the user has clicked on the scissors control (118) at the point where he started to discuss Jane's performance. Rather than using the "smiley" annotations within the recording, he has chosen to split the recording at this point in order to send this portion to Jane (in this case using "Forward" via email icon once the call is over). This only appears once a recording is complete, e.g., (117) and hence is not yet shown for the lower message. The split is indicated by a separator (116) and the creation of a new message (above or below the previous one according to user preference). Control (132) shows that the top message is now no longer active, as indicated by the lack of a coloured background, which is represented by the lack of fill pattern, but still indicates the method of communication (called Tim's cell phone).

The now complete telephone call, being a real-time interaction with a duration, shows a time period (119) unlike an email which has a "point" time of arrival. Alternative displays such as "start time and duration" are possible. The current call may show start time and no end time or duration (120) or may show current time and/or duration and be updated as this progresses.

The above approach may be used for voice communications—regardless of whether these occur via traditional telephony, VoIP or other services.

Instant Messaging

As with live and attempted live telephone or video calls, so similar features apply to instant messenger or "chat" applications. Should the user of the invention decide to communicate with one or more of the participants on the thread using a web-chat application such as Instant Messenger® they may find that one or more of the recipients—even though they are showing as "online" or "available"—does not actually respond. In such a case, the effort of typing one or more messages into the chat application is wasted as these must then be copied into an email to ensure transmission to all parties.

A similar problem occurs when only some of the participants subscribe to the messaging service chosen. An email may need to be sent to the other participants to let them see what has been agreed between those who did speak in "real-time". Many such systems—for example Skype®—provide a readily available interface that allows developers to layer such applications onto the underlying mechanism.

The invention therefore optionally includes integration to one or more instant messaging mechanisms. This allows a real-time discussion to be undertaken via an instant messaging mechanism while at the same time building a textual, time-stamped record of the interaction. This may be sent as the body of an email during or after the discussion.

When recording interactions made over such "instant" messaging services, the exchanges are actually not "instant" but many are nearly so. There is a benefit in grouping exchanges "paragraphs" in a similar way to that described for audio conversations. By setting one or more threshold intervals (e.g. 5 minutes and 1 hour) the exchanges can be summarised more efficiently than is typically achieved by simply cutting and pasting from a chat window. In the latter case, every exchange is often time-stamped but in many cases just knowing the start time of the group of exchanges is adequate and makes it easier to read the record of what was exchanged.

Figure 18:
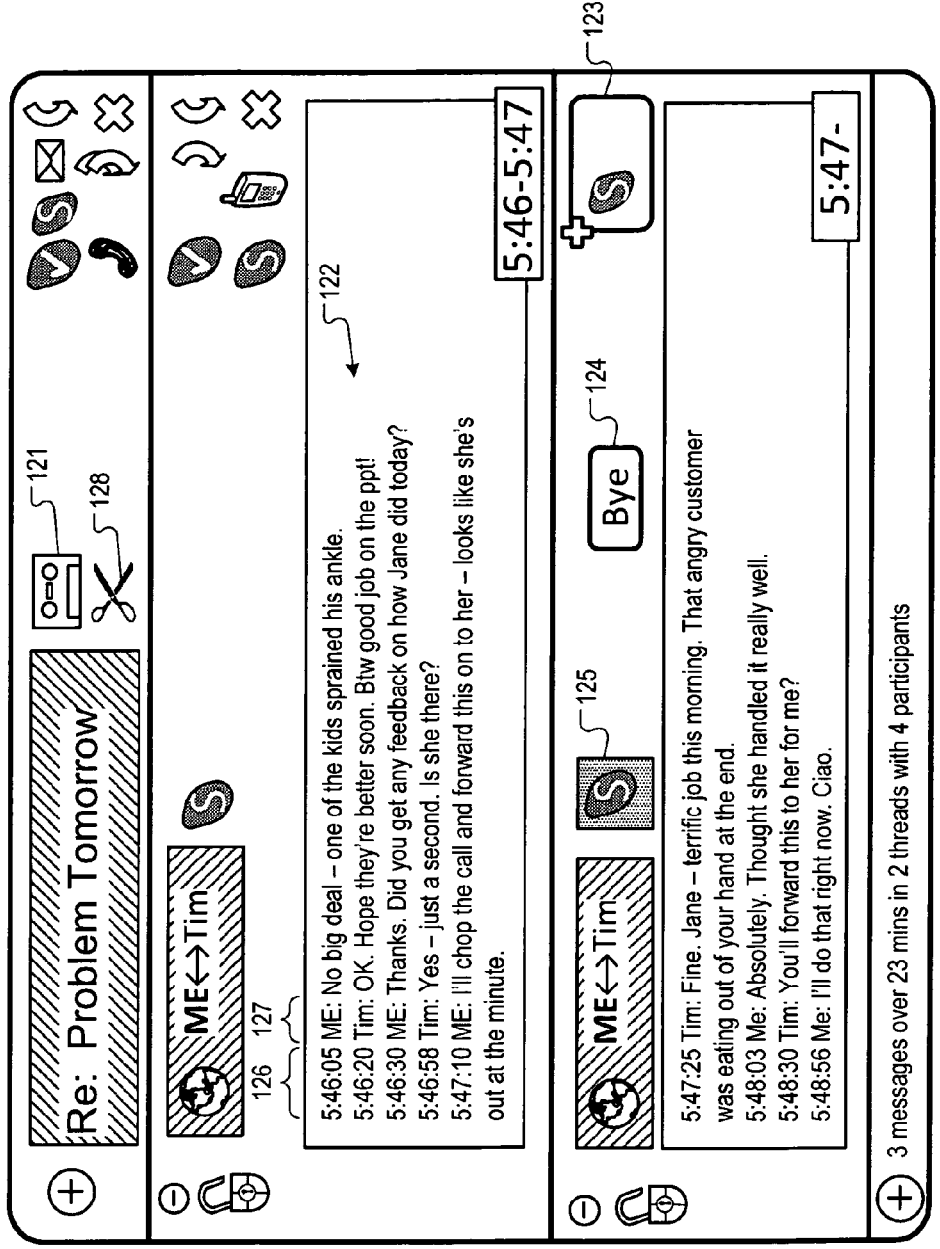
FIG. 18—Presentation and annotation of "chopped" instant messaging session.

FIG. 18 shows a very similar interaction to that of FIG. 17; however FIG. 18 is related to instant messaging. The recording (121) and "chop" (128) controls operate as they did for telephony calls—controlling and showing whether or not recording is enabled/disabled/taking place and allowing the recording or "timestamped and annotated transcript" as it is in this case to be split into multiple messages as the interaction progresses.

The messages exchanged are shown (122) and new messages can be typed into this window or a separate text control.

Interaction is occurring within this application rather than the window of the instant messaging system. The latter may be used—in which case this application will be recording the interaction as it progresses rather than showing it.

Timestamps (126) may be optional. It is not always important to see how rapidly someone responded. Names (or abbreviations thereof) may be optional. Simply colouring the text consistently for "sent" and "received" may be adequate—especially in a two-way interaction. The colour keying may be shown by colouring the addresses in the list above the text area the same way as the text is being coloured. This is especially powerful for multi-way conferences.

To save space and for consistency with the other use of addresses, the names shown (127) may not be those known to the particular instant messaging service being used. Instead these are consistent with the abbreviations defined by the application and shown in address lists.

The type of interaction and whether or not it is still active is shown as before (125), i.e., the instant messaging icon has a green background, indicated by a fill pattern, indicating that an instant messaging session is active.

One or more controls that would normally be present in the IM client are provided for ease of use (124).

Additional participants may be added to the interaction using any means appropriate (123). This may include other types of IM or even cellular text messaging (SMS).

Cellular Text Messaging

Similar issues occur with text messaging (e.g. Short Message Service or "SMS") via mobile phones. If this method is chosen to advise some participants of an update to the discussion, the other participants will probably want to receive an email with the same or similar content. Hence the invention can also copy the text messages sent to an email.

Optionally, the invention may, by default, select the remainder of the participants—those who did not participate in the real-time or preferred method of communication—as the recipients for the corresponding email.

Incoming Contacts

The above examples have shown how an existing message thread is extended by the user of the invention initiating a further interaction. A similar approach is taken if the user of the invention takes an incoming call such as a telephone call. Regardless of whether it is associated with an existing message thread—this too will be recorded by default (according to user preference).

Figure 19:
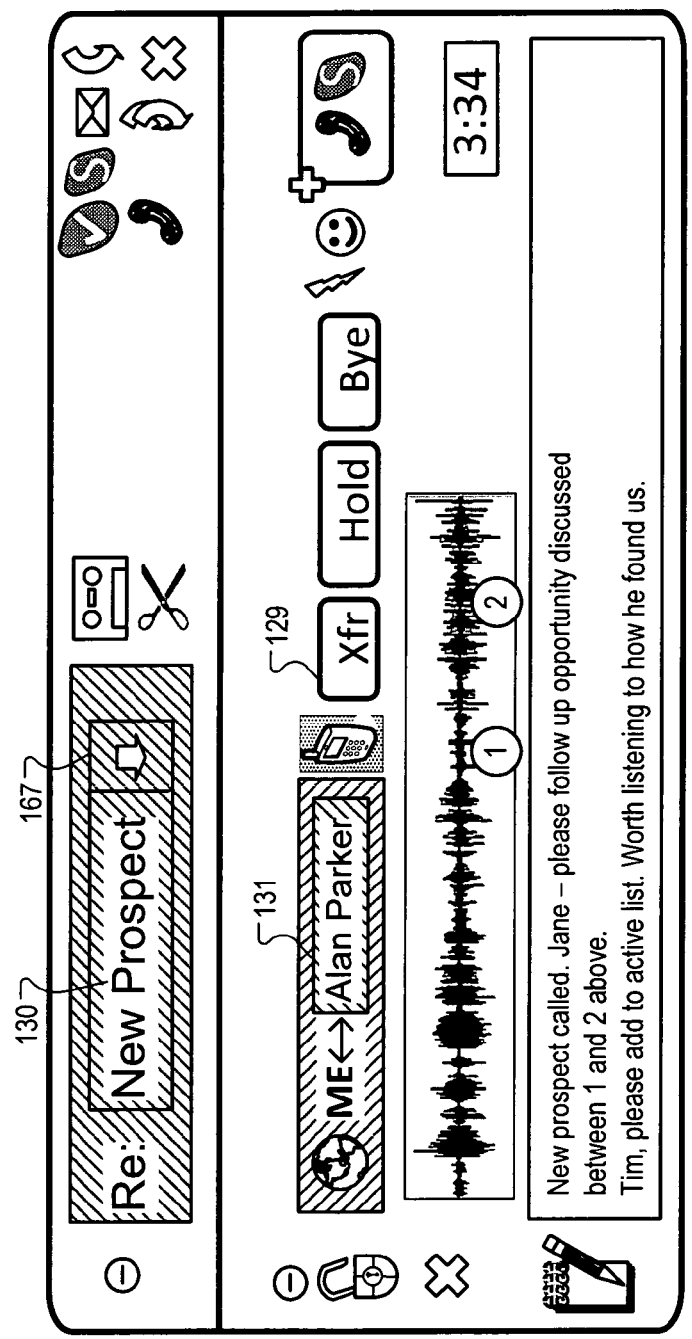
FIG. 19—Presentation and annotation of an incoming telephone call.

An example of this feature is shown in FIG. 19. In the environment of FIG. 19, the subject may be initially blank. The user can type the name of a new thread (130) or select an existing thread using drop-down list (167) once he understands the context of the call. Preferably, the list of threads will show active threads but the user may choose to select (and hence re-activate) a previously closed thread.

Preferably, integration with the communications system allows the calling party to be identified. If this is only as a telephone number, then a reverse lookup into one or more directories may be used to determine their name which will be shown (131). If a name cannot be determined or is wrong or ambiguous, the user may enter a name and/or select one from an existing list.

The same means of marking the recording as it progresses as described above apply. Appropriate controls (129) are shown to allow the user to perform functions during the interaction. During or after the call completes, the user can choose to send all or edited sections of the recording to one or more recipients.

Visual Interactions

Figure 20:
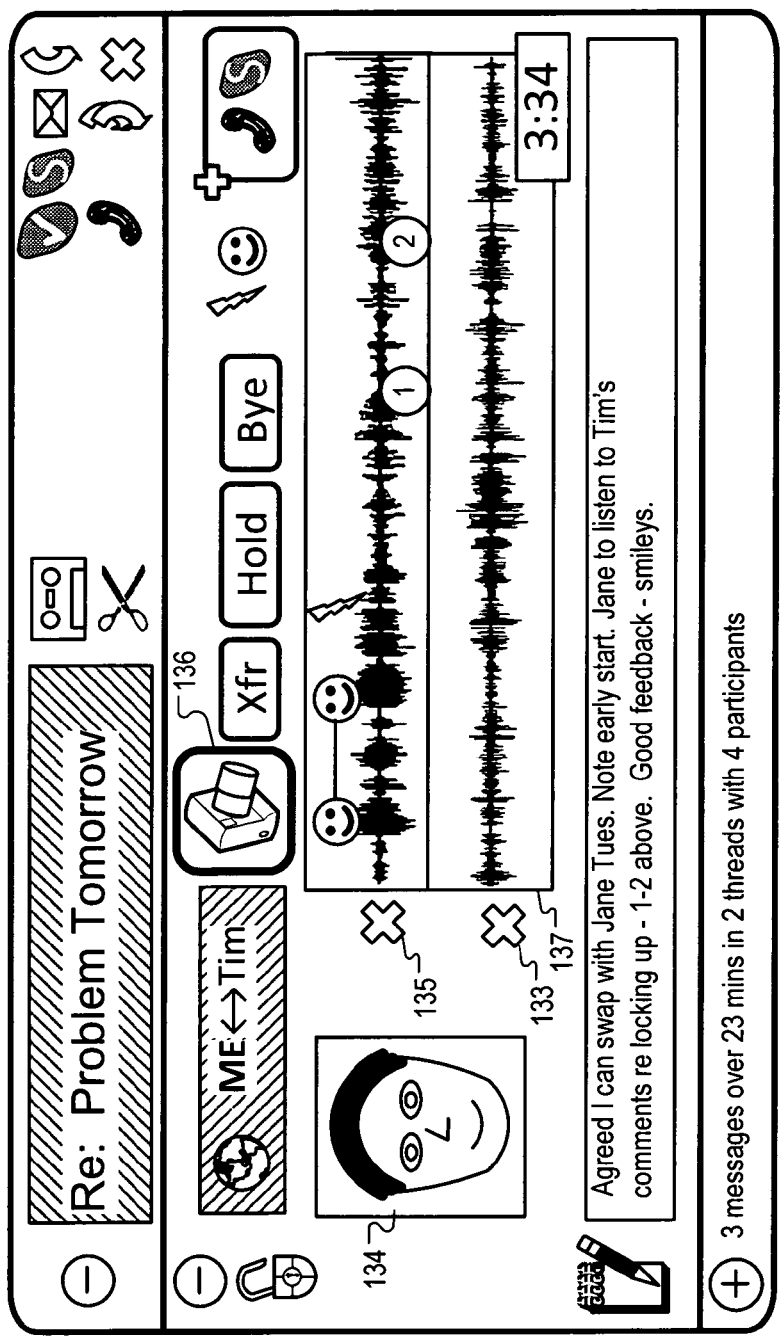
FIG. 20—Presentation and annotation of an active video call
FIG. 21—Exemplary system design.

Video calls be handled in a similar fashion. FIG. 20 shows an exemplary presentation of such a call. The type of interaction is indicated by a camera icon (136) and may be shown as part of the summary view of the interaction.

Instead of or as well as showing the level of audio one may show the amount of video activity over time (137). This can be calculated, for example, using motion detection algorithms or others that compare successive frames or simply from the bandwidth used where a variable bit rate signal is transmitted.

In addition to inferring "paragraph breaks" from pauses in the audio, a lack of screen activity or, conversely a significant change as occurs on scene boundaries can be used to identify significant points within a video stream. These may cause "line-wraps" as with the telephone call example earlier.

In addition to showing the level of video activity, small "thumbnail" views (134) of the video may be shown—at scene change boundaries and/or regular intervals to give the viewer a "storyboard" overview of the recorded video. This helps them to know which section(s) of the video they wish to view.

As with the telephone call, the user can annotate the recording by clicking on it during the recording, and the user can replay a completed recording from any point within it by clicking on the waveform(s) versus time display(s) e.g. (137) at the point they wish to play from.

Audio and video recordings may be deleted independently of each other using the control (135), (133) next to the appropriate waveform display.

Other collaborative communications such as shared web-browsing, desktop sharing, remote PC access, electronic white-boarding and the like can be handled in the substantially the same way as video calls though in some cases additional information such as the text being displayed can be extracted from the streams used to record the interactions. This provides further indexing and search capabilities similar to those discussed in the case of LVSR transcriptions of audio calls.

Further Integrations

This specification has concentrated on the presentation, control and recording of interactions. As with any email and other communication application, the invention may be further enhanced by integrating it with other applications. These include but are not limited to Calendars and scheduling tools; Task List/To Do list management tools; Transcription tools (from word-processors to court reporting tools); Customer Relationship Management (CRM) systems; Call Centre applications e.g. Quality Monitoring, Call Flow design, Helpdesk applications, etc.; and Enterprise Resource Planning (ERP) systems.

Integration may be achieved in a variety of ways. For example, including menu items, toolbar buttons or other controls within the presentation formats shown in this specification or conversely by embedding these message handling tools within the larger application.

System Design

The invention may be realised through software, hardware or a combination of these. It may be implemented on a single computer or the functionality distributed across multiple computers that need not be co-located. Standalone application, client-server or web and browser based implementations are all feasible. Portions of the systems and methods can be implemented on hand-held devices or client computers. Examples of such portions include the rendering of the environments described above, the parsing of e-mail messages to create the display environments above, and the generation of corresponding commands.

Portions of the systems and methods can be implemented on servers. Examples of such portions include the generation of display data for the rendering of the environments described above, the parsing of e-mail messages to create the display data, and the processing of corresponding commands received from client devices.

The specification describes a wide range of options and possibilities. As is standard practice in such applications, the preferred settings for these may be set both at an overall (shipping default), a corporate (e.g. set at install time) and personal (e.g. change via a "Tools>Options" menu or similar) level.

Although the description of the invention concentrates on the on-screen display of information, many of these techniques are also advantageous when printing, copying or pasting the message for use in other applications. Likewise, the same techniques are useful when a permanent record of such an exchange is stored in an archival system or as part of a larger system such as a Customer Relationship Management (CRM) system. By reducing both the data size and the physical presentation area needed yet maintaining the information content, it is both easier to store and for a reader to grasp the meaning of the information.

Audio recording can be achieved in many ways. The user's telephone handset/headset can be connected via appropriate circuitry to the line in and/or microphone connections on the computer. Where an IP telephony system such as Avaya® Communication Manager is available, a "soft-phone" can be instantiated on the PC using Avaya's Distributed Media and Call Control (DMCC) Application Programming Interface to receive a copy of the audio stream which can then be stored to a file on disk. A separate recording system may be available and this application may instruct it to record and/or have access to recordings that may be made automatically by it.

Figure 21:
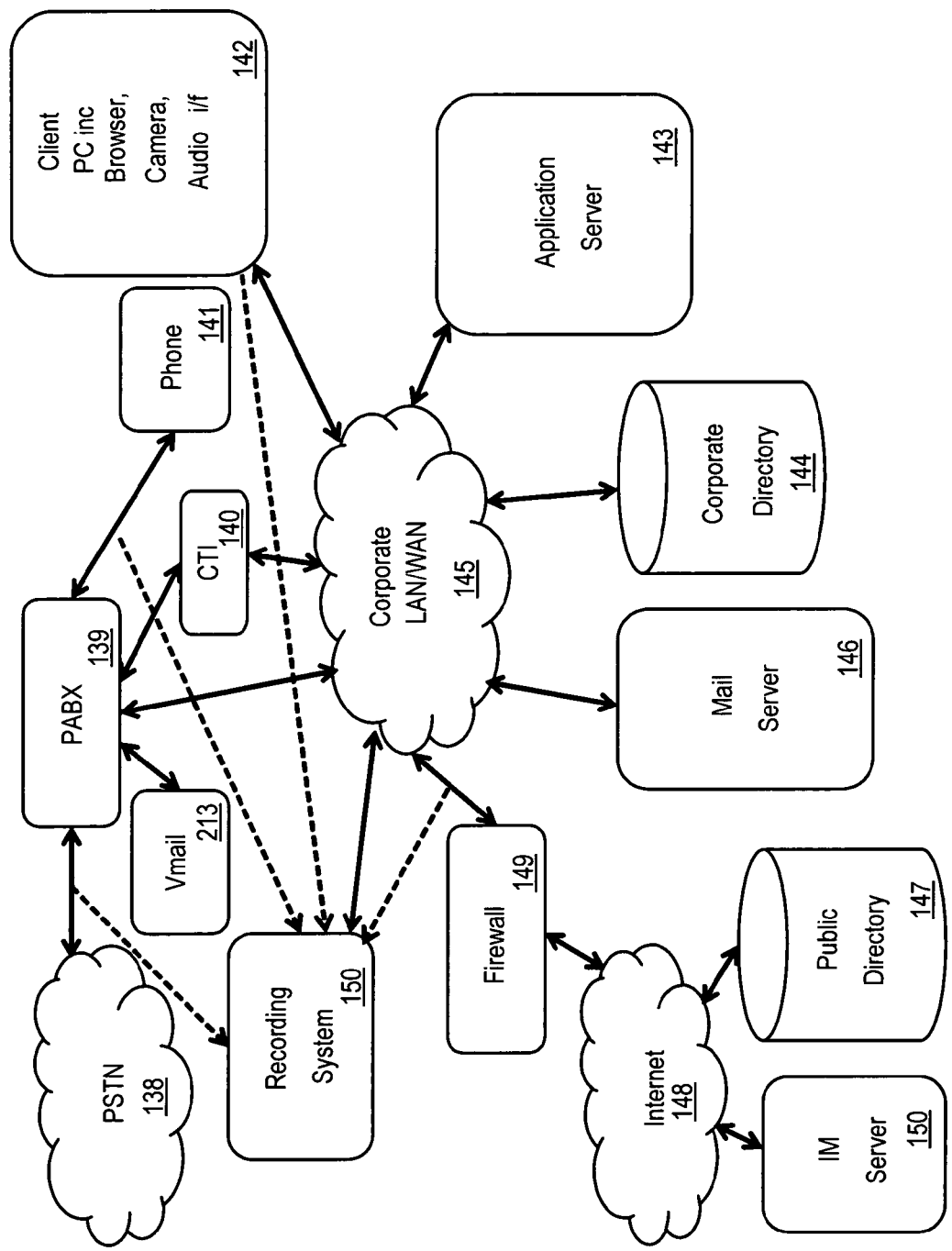

FIG. 21 shows an exemplary system design, in which the invention is instantiated on one or more Application Server(s) 143. As with each of the elements of this diagram, multiple independent heterogeneous examples of each component may exist; each may be distributed across the network and/or partitioned for scalability. The system is further described below.

Optionally, the application server (143) is configured with access details for one or more directories and/or address books from which it can expand upon the addresses (email addresses, instant message "handles", telephone numbers etc.) found within the messages it is to process. Such directories may exist within the enterprise (144) and/or (147) on the internet (148) (e.g. Skype® directory services). These often conform to standards such as the Lightweight Directory Access Protocol (LDAP) or similar—allowing easy interrogation by the application server. Additional directories (or "address books") may be found on the client PCs (142) and/or Mail Servers (146). The application will also interrogate these where it is made aware of them and is granted access—so as to build as complete a picture as possible of the individuals who are communicating.

The application server will normally have access to at least one Mail Server (146)—though in an alternative implementation it may encompass Mail Server functions within the application itself. Mail Servers may be located on the company's network (145) or on the internet (148), e.g., freely-available mails services. It is not unusual for a system to require links to many mail servers, particularly in a large enterprise.

Links to Instant Messaging (IM) services (150), whether corporate or public (latter shown in FIG. 21) typically provide presence services as well as directory and connection establishment services within them. The Application server may establish logons with the IM server on behalf of one or more users or these may be established directly on their computers (142) with links back to the Application server advising it of status, presence etc.

A Firewall can exist between internet (148) and Corporate network (145). In addition to blocking some traffic between these, there is often Network Address Translation (NAT) occurring at this point. Where the Application Server is supporting users on the internet as well as within the firewall, it may be necessary for the remote components of the application to pass back addressing information allowing the mapping of streams across this boundary. Where remote clients are using a VPN to access the corporate network, however, there is no need to translate as the VPN makes them appear to be inside the corporate network.

Telephony integration is typically achieved by connection to one or more internal telephone switches (or Private Automatic Branch Exchange, PABX) (139). Such switches normally provide Computer Telephony Integration (CTI) services which are often connected via a dedicated CTI server (140). Regardless of this topology, the application may determine activity on the switch by using the published CTI mechanism(s). On many switches it is also possible to emulate a telephone and/or observe a telephone using a "softphone". This may be instantiated at the user's computer (142) or on the server (143). Increasingly, such interfaces allow not just visibility and control over telephony functions but also provide access to the media streams (the voice). The user may have a real telephone (analogue, digital or IP) (141) and/or telephone capabilities (a "softphone") on his computer (142). Most telephony systems also support a Voicemail capability—whether on a separate server (213) as shown or embedded into the switch (139). Standards exist for integration with Voicemail systems—either through the switches main CTI interface(s) or a dedicated interface to the voicemail itself. In this way the application server can leave messages, retrieve messages, determine whether a user has messages waiting etc. It will be appreciated that the same or better degree of integration is possible in "soft" IP telephone systems (e.g. those using Session Initiation Protocol (SIP)) as in the more traditional topology drawn in this example.

Recording of calls and messages can be performed in a variety of ways. The aforementioned Voicemail (213), Mail servers (146) and Instant Messaging services (150) typically include some degree of recording and/or archival. Increasingly, telephone systems (139) also include recording features. Alternatively, a dedicated recording system (150) may be connected. Such systems are well known and may be recording voice, data, email, screen content, video etc. It may be tapping into communication paths unobtrusively and/or using the switching capabilities of the other components discussed to join the interactions as a (usually silent) participant. The application (143) may interface to the recording system (150) to control its activities and/or make use of recordings it has made or is making Alternatively, some or all recording functions may be performed within the application itself by implementing aspects of the recording system. Likewise some recording may be undertaken at the user's desktop by applications running on the user's computer or additional hardware located nearby.

The user's computer (142) will typically access the application through a browser or a client application. In both cases communication with the Application Server (143) is established. Interaction with the other components in the diagram may be direct or via the application server (143). The former allows better scalability and minimizes round-trip delays. Optionally the user's computer will have sound input and/or output devices to allow audio communication directly from it. Otherwise a separate audio device such as a telephone (141) or VoIP phone will be required for audio calls. Ideally, the computer (142) also has video capture capabilities allowing video calls to be placed. Note that this is not necessary for one-way video calls. The incoming video can be displayed on screen even if the user has no means of capturing their own image to send.

By designing the system to accommodate an arbitrary number of communication mechanisms, each of which is either real-time or not; supports audio or not; supports video or not etc. an extensible system can be deployed such that the addition of a new communications mechanism is a relatively straightforward exercise.

Various aspects of the invention have been disclosed. These aspects include message thread presentation systems and methods that relate to the visual presentation of the interaction between two or more parties via one or more messaging and/or real-time communications media.

In an aspect, names associated with e-mail addresses can be shortened, and names can be selected from a personal list of nicknames/first names only/abbreviations for closest colleagues. A sender's or recipient's own name can be shorted, e.g., to "ME."

In an aspect, names can be highlighted to indicate an addressing status (e.g., a "To" recipient, or a "CC" recipient).

In an aspect, rather than grouping into traditional From, To, CC, bcc groups, names can be grouped first by other attributes, e.g. domain, status, etc. In a related aspect, participants sharing a common attribute are grouped together so as to require less space and to allow truncation of a long list (e.g. A, B, C . . . ) without pushing those in other groupings out of visible range. In still another related aspect, participants can be grouped by company. A company may include several domains, and a list for each domain can be truncated and optionally expanded. In still another related aspect, participants can be grouped by time zone or by availability. Additional graphical attributes include corporate colors or logos for participants that belong to the same company. In an aspect, these corporate colors and logos can be downloaded from the company's web site or data server.

In another aspect, graphical attributes can also show a hierarchy in a message or a thread of messages. The hierarchy can be based on reporting lines (e.g., direct report to supervisor), a corporate directory, manual entry.

In another aspect, graphical attributes can be shown changes in preference to repeated lists. For example, rather than repeating a full list of participants for each constituent message in an e-mail thread, only those participants added and/or removed or whose role has changed can be shown. In a related aspect, the abbreviation (name) associated with the sender address can be formatted according to a graphical attribute to indicate the participant's involvement, e.g., whether the participant has ever replied to a constituent e-mail in a thread, whether the participant has read an e-mail, whether the participant has received the e-mail message, etc.

In another aspect, participation in sub-threads can be indicated by graphical attributes. For example, those engaging in "conversation" on a sub-thread, those added to distribution lists on thread/sub-thread, and those dropped off lists on thread/sub-thread can be shown by graphical attributes.

In another aspect, automatically generated e-mails, e.g., "housekeeping" e-mails, can be processed to take account of the email in the subsequent presentation of the message thread. For example, rather than show a return receipt e-mail from a recipient, the recipient name can be updated with a graphical attribute that indicates the recipient has read an e-mail message.

In an aspect, for out of office replies, undeliverable notification, return receipts, etc., additional actions and graphical attributes can include altering display characteristics of the recipient's name, altering the order in which recipients are shown, and altering and/or creating a grouping of recipients.

In an aspect, the time between receipt and response for each constituent e-mail in a thread can be shown. In some aspects, the times can be colour coded within service level agreements. In a related aspect, the passage of time relative to a first constituent e-mail in a thread can be shown instead of or as an alternate to absolute date and time. In an aspect, e-mails can be automatically processed to extract differences existing within a thread. The differences can be highlighted, such as by redlining or otherwise highlighting the new/changed parts of the message, or by compacting the unchanged parts of the message.

In an aspect, reduction of whitespace can be used to present e-mail messages in a more compact form. In some aspects, blank line removal, font manipulation, and "Kerning"—taking advantage of whitespace to allow other information to move closer to the body text—can be used.

In an aspect, message bodies can be collapsed or expanded, such as constituent message bodies displayed in a thread. In an aspect, the thread is presented as a hierarchy of body content, each section of which can be collapsed to a single line/summary or expanded.

In an aspect, methods of participating in a communication include right-clicking over a red response time indication to generate automated apology email; escalation options, etc.

In as aspect, multiple message thread presentation can be used to present a plurality of message threads displayed according unique graphical attributes associated with each e-mail thread.

In an aspect, a user's environment can be optimized by ranking recipients for abbreviation. By analyzing who the user interacts with, suggestion can be made to the user to specify shortened names for colleagues that will have biggest impact on presentation.

In an aspect, a user's environment can be optimized semi-automating selection of abbreviation. A single-click selection from set of automatically derived abbreviations can be facilitated for the user.

In an aspect, a user's environment can be optimized by presentation of active threads. Rather than forcing an initial categorisation by "folder" (hence making it easy to miss new threads where only a "Sent" message exists) all active threads are presented regardless of folder the message(s) are stored in.

In an aspect, a first constituent message in a thread is presented with the subject displayed in the subject field, and subsequent constituent messages in the thread are presented with the start of the body text in the subject field instead of repeating the same subject line.

In an aspect, lists of recipients in a thread are reordered to highlight changes between them.

In an aspect, unified messaging is facilitated by highlighting the most appropriate means for communication. In a related aspect, unified messaging is facilitated by recording real-time interactions. In a related aspect, unified messaging is facilitated by incorporating the recorded messages and real-time interactions into the historical record of an e-mail thread. In a related aspect, unified messaging is facilitated by editing recordings, annotating recordings, and forwarding recordings.

The above list of aspects can be implemented separately or in combination with each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   identifying address data for an interaction, the address data defining participant addresses for a plurality of participants in the interaction;
   categorizing a first set of one or more participant addresses according to each participant's role in the interaction as belonging to an initiator category or to one or more other participant role categories;
   associating a first graphical attribute with the initiator category;
   associating a further graphical attribute with each of the one or more other participant role categories;
   wherein a viewer of the display space is a participant in the e-mail message;
   wherein each graphical attribute causes its associated display text to be displayed in a manner indicative of the participant role category to which the participant address associated with the display text belongs;
   wherein participant addresses are also grouped into a plurality of domain groups so that those participant addresses within a local domain group have a common domain name identical to the domain name of the participant address associated with the viewer and those participant addresses having domain names other than the domain name of the participant are grouped into a plurality of non-local domain groups; and
   displaying the corresponding display text for each address according to its corresponding graphical attributes, each graphical attribute indicating each participant role category, within a common display space wherein each domain group of participants corresponding to a specific domain name is displayed in a common area of the common display space with the local domain group being displayed together with the viewer's participant address, the display space displayed as a single user interface element within a representation of the interaction.

2. The computer-implemented method of claim 1, further comprising, for each participant address, associating a corresponding third graphical attribute with the display text of the participant address, each corresponding third graphical attribute indicating whether the interaction has been determined to have been received at the participant address.

3. The computer-implemented method of claim 1, further comprising:
   categorizing a second set of one or more participant addresses as belonging to a second addressing category that does not include the initiator category; and
   using a common further graphical attribute for each of the one or more participant addresses in the second set for display within a display space defined by a second boundary that is separate from the first boundary.

4. The computer-implemented method of claim 3, wherein categorizing the second set of one or more participant addresses as belonging to the second addressing category that does not include initiator category comprises grouping all participant addresses that do not include the domain name identical to the domain name of the participant address associated with the viewer.

5. The computer-implemented method of claim 3, wherein categorizing the second set of one or more participant addresses as belonging to the second addressing category that does not include the initiator category comprises grouping all participant addresses that include a common domain name that is different from the domain name of the participant address associated with the viewer.

6. The computer-implemented method of claim 1, wherein categorizing a first set of one or more participant addresses according to each participant's role in the interaction as belonging to an initiator category or to one or more other participant role categories comprises grouping all participant addresses that belong to a company to which a participant address associated with the viewer belongs.

7. The computer-implemented method of claim 1, further comprising:
   identifying a receipt time of the interaction;
   determining a current time; and
   displaying a difference between the current time and the time of receipt of the interaction.

8. The computer-implemented method of claim 1, wherein the interaction is a constituent interaction within a thread of related interactions, and further comprising:
   identifying a plurality of other constituent interactions of the thread; for each other constituent interaction:
   identifying address data for the constituent interaction, the address data defining participant addresses for a plurality of participants in the constituent interaction;
   categorizing a first set of one or more participant addresses according to each participant's role in the interaction as belonging to an initiator category;
   associating a first graphical attribute with the initiator category;
   associating a further graphical attribute with each of the one or more other participant role categories;
   wherein each graphical attribute causes its associated display text to be displayed in a manner indicative of the category to which the participant address associated with the display text belongs; and
   displaying the corresponding display text for each address according to its corresponding graphical attributes within a common display space, the display space displayed within a representation of the interaction; and
   displaying the corresponding representations of the constituent interactions in chronological order, the chronological order being defined by the times at which each constituent interaction was received.

9. The computer-implemented method of claim 1, wherein the interaction is an e-mail message, the initiator category is a sender category, and the one or more other categories are recipient categories.

* * * * *